(12) United States Patent  
Eilersen

(10) Patent No.: US 7,024,948 B2  
(45) Date of Patent: Apr. 11, 2006

(54) SEALED LOAD CELL

(76) Inventor: Nils Aage Juul Eilersen, Goengehusvej 226, Vedbacck, 2950 (DK)

( * ) Notice: Subject to any disclaimer, the term of this patent is extended or adjusted under 35 U.S.C. 154(b) by 0 days.

(21) Appl. No.: 10/863,003

(22) Filed: Jun. 7, 2004

(65) Prior Publication Data

US 2005/0132820 A1  Jun. 23, 2005

Related U.S. Application Data

(63) Continuation of application No. PCT/DK02/00826, filed on Dec. 7, 2002.

(30) Foreign Application Priority Data

| Dec. 7, 2001 | (DK) | ................................ 2001 01822 |
| Feb. 27, 2002 | (DK) | ................................ 2002 00298 |
| Mar. 19, 2002 | (WO) | ..................... PCT/DK02/00182 |

(51) Int. Cl.  
*G01L 1/04* (2006.01)

(52) U.S. Cl. .............. 73/862.627; 73/862.634

(58) Field of Classification Search .......... 73/862.627, 73/862.628, 862.629, 862.632, 862.634, 73/862.636, 862.637, 822.627  
See application file for complete search history.

(56) References Cited

U.S. PATENT DOCUMENTS

| 4,196,784 A | * | 4/1980 | Suzuki et al. ................ 177/211 |
| 5,604,336 A | * | 2/1997 | Johnson ....................... 177/229 |
| 6,363,798 B1 | * | 4/2002 | Gitis et al. .............. 73/862.391 |
| 6,794,587 B1 | * | 9/2004 | Aumard et al. .............. 177/211 |

* cited by examiner

*Primary Examiner*—Max Noori  
(74) *Attorney, Agent, or Firm*—Donald S. Dowden; Cooper & Dunham LLP

(57) ABSTRACT

The invention relates to a precision load cell with an elastic body comprising a base end, a load or force receiving part and two or more beams connecting said base end and said load or force receiving part. At least one of the beams constitutes a lever connecting the load or force receiving part and a flexible wall of a sensor cavity placed in the base end. The flexible wall is adapted for undergoing deformation as the result of a displacement of the load or force receiving part through an action of the lever, and the sensor means are adapted for measuring the deformation of the flexible wall or the strain in the flexible wall.

15 Claims, 23 Drawing Sheets

SEALED LOAD CELL

This is a rule 1.53(b) continuation, and claims the benefit of priority of application Ser. No. PCT/DK02/00826 filed Dec. 7, 2002.

The invention relates to load cells for measuring mechanical loads and forces, comprising an elastic body fitted with sensors for measuring the strain in the elastic body or the deformation of the elastic body in response to the load or force to be measured.

A large group of low cost and low precision load or force sensors exists, where elastic bodies of various shapes, such as discs or wheels with spokes, are fitted with various strain gage-, inductive-, capacitive- or optical sensors.

These load or force sensors are dependent on the point of application of the load or force and are mostly used in OEM applications as simple force sensors, accelerometers and joy sticks.

The invention relates more specifically to a precision load cell with an elastic body comprising a base end, a load or force receiving part, two or more beams connecting said base end and said load or force receiving part, and sensor means adapted for sensing the strain in the elastic body or the deformation of the elastic body, due to the load or force to be measured.

The standard type of load cell used by most manufacturers for production of precision strain gage beam load cells is designed as the well known and classic Roberval mechanism with a high strength aluminum elastic body, containing a base end for mounting the load cell on a supporting structure, a load or force receiving part where a load or force may be applied and two beams connecting the base end and the load receiving part.

Often a third beam is introduced between the two aforementioned beams.

Strain gages are applied in positions on the beams where the strains, produced by the load or force to be measured, have their maximum and minimum values.

Through the years this concept has been developed to provide rather high accuracies, but the normal procedure of potting the strain gages with silicone rubber to try to avoid the problems with failed bonding and decreasing insulation resistance, resulting from humidity in the environment, and the inherent sensitivity to overloads of the strain gage technology, means that this type of load cell is not suitable for tough industrial environments. Furthermore the extra process steps necessary for interconnecting strain gages distributed along one or more beams and connecting them to the signal cable followed by the potting process is rather time consuming and costly.

It is the object of the invention to provide load cells of the aforementioned precision type, fitted with sensor means which, mounted in sealed cavities, measures the load or force applied to the load cell, with a high precision in industrial environments.

According to the invention this object is achieved by a load cell of the initially mentioned precision type, wherein at least one of said beams constitutes a lever connecting the load or force receiving part and a flexible wall of a sensor cavity placed in the base end, said sensor cavity includes said sensor means, said flexible wall being adapted for undergoing deformation as the result of a displacement of the load or force receiving part through an action of said lever, and said sensor means being adapted for measuring the deformation of the flexible wall or the strain in the flexible wall.

This way and according to the invention the load or force to be measured maybe measured by a number of sensor types all separated from the surrounding environment by walls of the sensor cavities thereby enabling the load cell to function in tough environments.

In a preferred embodiment of a load cell according to the invention, said sensor cavity includes a plurality of sensors for measuring the deformation of the flexible wall or the strain in the flexible wall.

An important advantage by this embodiment is the possibility of averaging temperature effects and also by providing the means for compensation of the effects of bending forces by adjusting the relative sensitivity of the sensors.

In an embodiment of a load cell according to the invention, sensor means are mounted on a surface of a sensor carrier, said surface facing the flexible wall, for measuring the deformation of the flexible wall.

This embodiment provides a sensor system, which because of a well defined distance between each of the different sensor parts, is simple to install in the load cell, especially if said surface, is flat. Furthermore an electronic measuring module may be integrated on the backside of the sensor carrier.

In still another load cell according to the invention, sensor means are mounted on a sensor carrier, which again is mounted on a stud, substantially perpendicular to the flexible wall. This load cell is simple to adjust as the gaps between the sensors and the corresponding walls of the sensor cavity are easily accessible.

Also in this embodiment an electronic measuring module may be integrated on the backside of the sensor carrier.

In a preferred embodiment of a load cell according to the invention, the sensor means includes a sensor system comprising a number of fins, mounted on and substantially perpendicular to the flexible wall, with sensors placed on one or more of the fins and being adapted for measuring the deformation of the flexible wall.

The advantage obtained by this embodiment is a very high sensitivity to the measured load and forces and a high degree of insensitiveness to stresses from mounting the load cell on its support.

In another preferred embodiment of a load cell according to the invention, the sensor means includes a sensor system comprising a number of fins, mounted on and substantially perpendicular to the flexible wall, with sensors placed between one or more of the fins and being adapted for measuring the deformation of the flexible wall.

The advantage obtained by this embodiment is also a very high sensitivity to the measured load and forces and an easy adjustment of the sensors as the gaps between the sensors and the corresponding fins are easily accessible.

In the embodiments of load cells, according to the invention, utilizing a number of fins, the width of the levers and the fins are smaller than the width of the sensor cavity, whereby the flexible wall is allowed to be deformed in the area between the inner wall of the sensor cavity and the edges of the levers and the fins.

In the embodiments of load cells, according to the invention, utilizing a number of fins, the fins may advantageously be separate units mounted on the flexible wall.

Hereby the advantage is obtained that the machining of the rather delicate fins is avoided and substituted by an assembly process of the separate fin units, either to short stubs machined on the flexible wall or directly to the flexible wall for lowest possible costs.

In another preferred embodiment of load cells, according to the invention, the sensor means comprises one or more strain sensors mounted on the flexible walls for measuring the strain in the flexible walls.

The advantage obtained by this embodiment is due to the closed sensor cavity, which shields against tough environments.

In still another preferred embodiment of load cells, according to the invention, the strain sensor means comprises one or more strain gages mounted on the flexible walls, for measuring the strains in the flexible walls.

The advantage obtained by this embodiment is due to the closed sensor cavity, which shields against tough environments and the possibility of a simple and compact wiring of the strain gages.

In an embodiment of a load cell, according to the invention, where only two beams are connecting the base end and the load receiving part of the load cell, one or more of these two beams may advantageously constitute the lever acting on the flexible wall, The advantages obtained are a simple construction and no interference from the spring constants of extra levers.

hi an embodiment of a load cell, according to the invention, where the sensor means are mounted on a sensor carrier, which again is mounted on a short stud, substantially perpendicular to the flexible wall, electrodes are placed on the sensor carrier, facing the flexible wall.

The advantage gained by this embodiment is a rather large change of distance between the electrodes and the flexible wall when the electrodes are placed on the sensor carrier at a distance from the short stud.

In another embodiment of a load cell, according to the invention, the sensor means constitute two separate sensor carriers, one above the other, which each are mounted on a short stud, substantially perpendicular to the flexible wall, with electrodes placed on each of the sensor carriers, facing the flexible wall. In this embodiment the change of shape of the flexible wall is used to provide the electrodes of one sensor carrier with an increasing and the electrodes of the other sensor carrier with a decreasing distance to the flexible wall when said flexible wall is deformed.

The advantage gained by this embodiment lies in the fact that a tilting of the electrode carrier on the short stud gives only small measuring errors as for example an increasing distance at one end of the electrode carrier is largely compensated by a corresponding decreasing distance at the other end of the electrode carrier.

In a preferred embodiment of the abovementioned invention, with two separate; sensor carriers, two separate levers are engaging the flexible wall, preferably at the positions of the two short studs carrying the two sensor carriers.

The advantage gained by this embodiment is a high deformation of the flexible wall directly at the position of the sensor means.

In an embodiment of the invention, strain measuring sensors applied to the flexible wall are activated by two levers engaging the flexible wall, preferably at positions where the action of the levers results in the maximum deformation of the strain sensors.

The advantage gained by this embodiment is a high deformation of the flexible wall directly at the position of the sensor means.

In another embodiment of a load cell according to the invention with fins mounted on the flexible wall, two levers are engaging the flexible wall preferably at positions where the action of the levers result in maximum deflections of the fins.

The advantage gained by this embodiment is a high deflection of the fins due to a high deformation of the flexible wall.

In a preferred embodiment of a load cell according to the invention, the base end and the load receiving part are extended in order to provide a load cell of the S type.

The advantage gained by this embodiment is the possibility to measure tension forces and hanging loads.

In another preferred embodiment of a load cell according to the invention, the base end is extended in order to provide a load cell with uncritical mounting means.

The advantage gained by this embodiment is the possibility to produce load cells with a very high precision, which at the same time may be mounted on rough surfaces and without any attention to the torque of the mounting screws.

In still another preferred embodiment of a load cell according to the invention the base end is provided with facilities for mounting the load cell on a vertical surface.

The advantage gained by this embodiment lies in the fact that many applications only provide vertical surfaces.

In a preferred embodiment of a load cell according to the invention a flexible part of the lever acting on the flexible wall is placed at a distance from the load receiving part in the direction of the flexible wall.

The advantage gained by this embodiment is the possibility to optimize the active length of the lever to the thickness of the flexible wall for different load cell capacities.

In a preferred embodiment of a load cell according to the invention, the base end and the load receiving part are extended with heavy extensions.

The advantage gained by this embodiment is the possibility to provide a load cell with robust mounting parts which are separate from the sensitive parts of the sensor system.

In another preferred embodiment of a load cell according to the invention, the base end, and the load receiving part are extended upwards and downwards. The advantage gained by this embodiment is the great distance between the beams which provide a load cell which is able to withstand high eccentrically applied loads, j In a preferred embodiment of a load cell according to the invention, the flexible wall is made thinner at the area next to the solid wall of the sensor cavity.

The advantage gained by this embodiment is that the deformations of the flexible wall is mainly determined by the dimensions of the flexible wall.

In still another embodiment of the invention, the flexible wall continues into and constitutes a part of the lever, acting on the flexible wall.

The sensor means of this embodiment are preferably strain measuring sensors and this embodiment provides the possibility of the measurement of an almost pure tension and compression in the flexible wall.

In preferred embodiments of load cells according to the invention, the abovementioned sensor means are capacitive.

The advantages obtained by capacitive sensor systems are the very high sensitivity to the forces and loads applied to the load cells and the non contacting measuring principle, which gives a high tolerance to shocks and overloads as only the elastic body is overloaded and not the sensor system.

In preferred embodiments of load cells, according to the invention, the abovementioned sensor means are inductive.

The advantage obtained by inductive sensor systems, is the possibility of functioning in extreme environments and the non contacting measuring principle which gives a high tolerance to shocks and overloads as only the elastic body is overloaded and not the sensor system.

Figure 1:
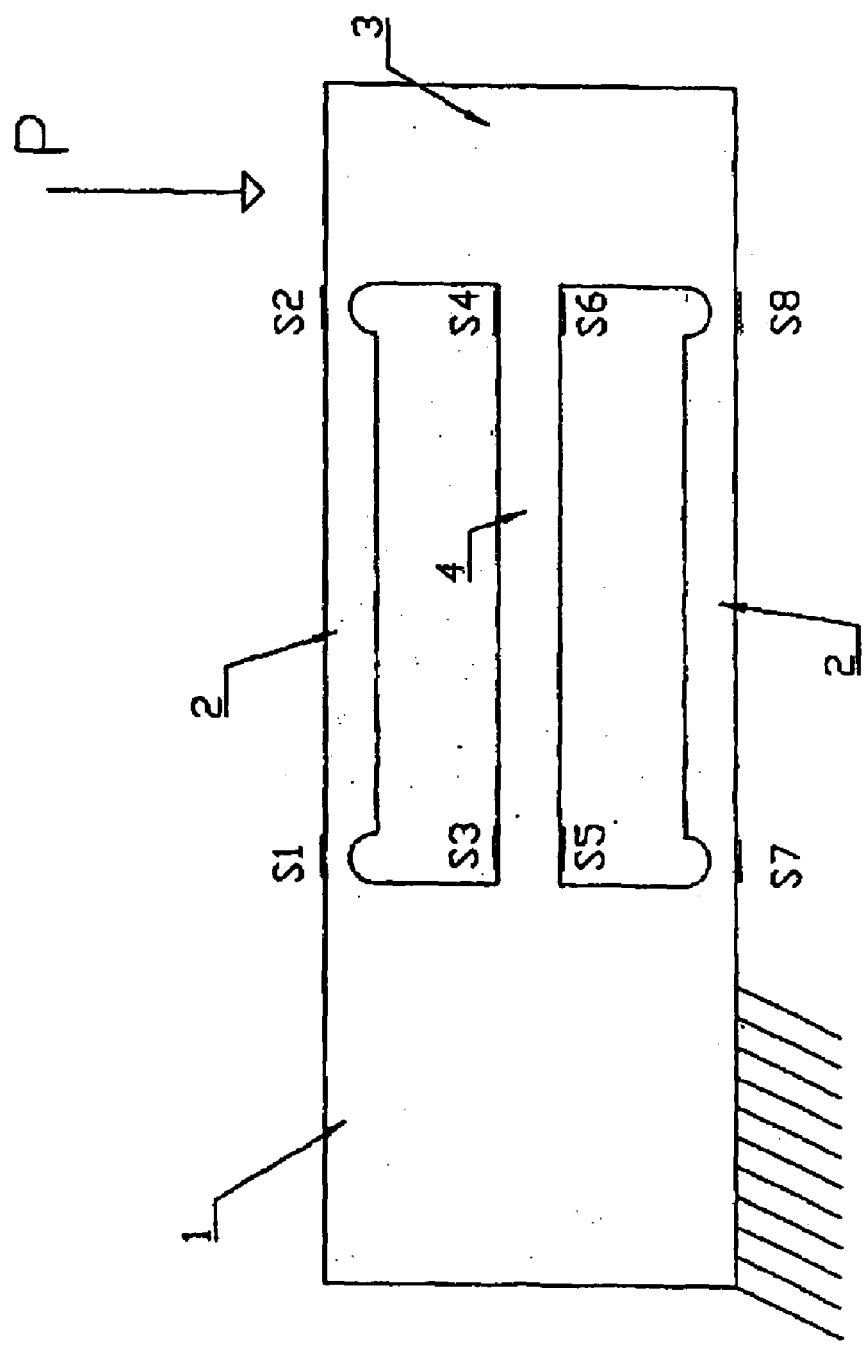
FIG. 1 shows, as prior art, a widely used version of a strain gage load cell.

The load cell in FIG. 1, which is shown supported at its left end, with a force or load P to be measured applied to the right end, demonstrates prior art and is the standard type of load cell used by most manufacturers for production of strain gage beam load cells.

The elastic body, which is normally fabricated in high strength aluminium, includes the solid base end 1, two beams 2 and a solid load receiving part 3.

This elastic body functions as the well known Roberval mechanism by blocking angular movements of the solid load receiving part 3, when the load P is applied, and thus restricts the displacements of the part 3 to parallel displacements, even when the load or force P is applied very eccentric.

This feature, which makes the load cell insensitive to where the load is applied, is prerequisite for precision measurements with load cells.

Often a third beam 4 is introduced between the two beams 2.

These load cells undergo deformations only at the two beams 2 and the third beam 4 and mainly in the positions SI to S8, while the base end 1 and the load receiving part 3 are solid and thus not deformed.

Strain gages are therefore normally applied hi one or more of these positions SI to S8, with a preference for the positions S3 to S6 because the third beam 4, through the action of the beams 2, is deformed in a well defined S formed shape.

Figure 2:
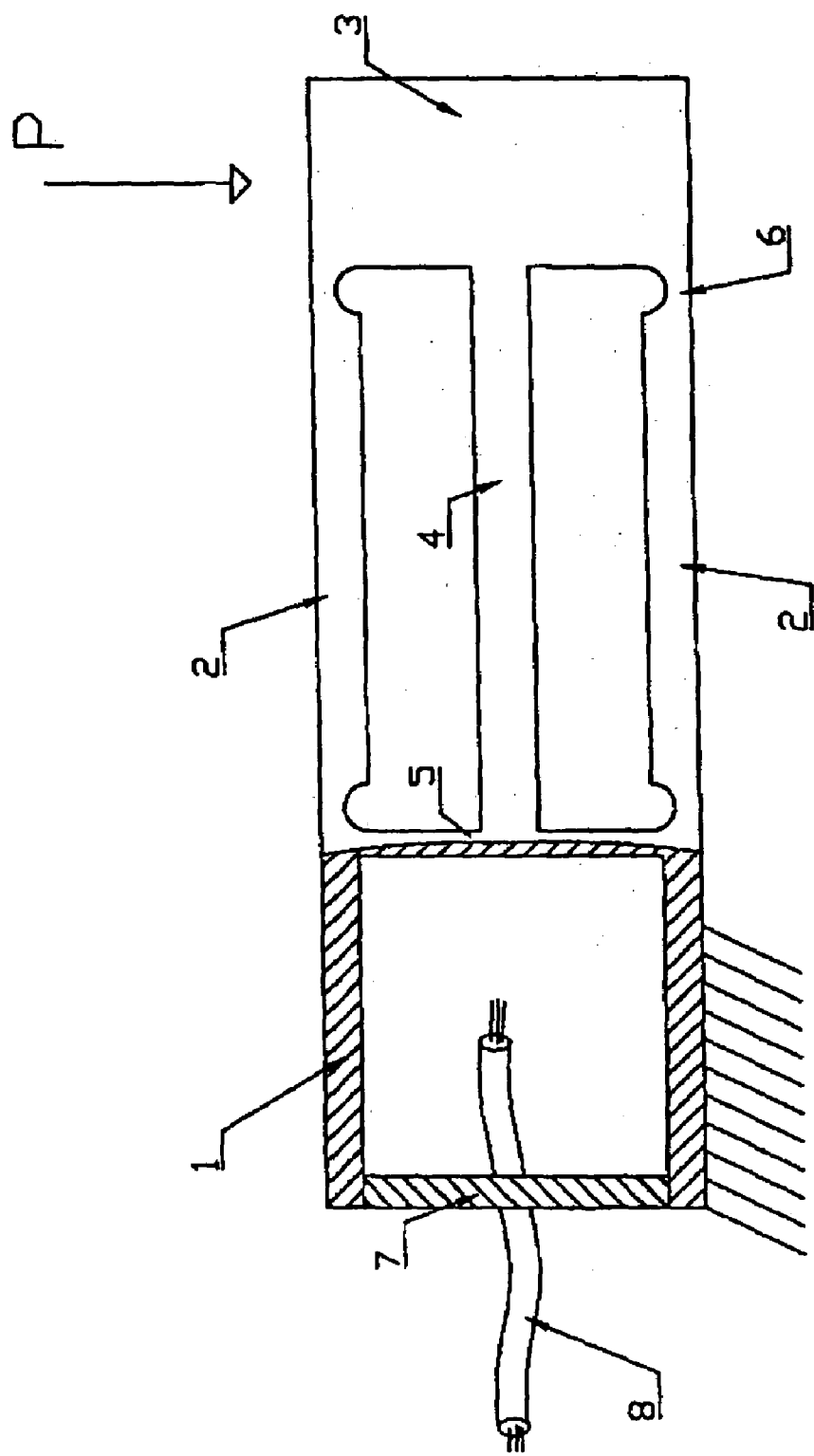
FIG. 2 is a basic embodiment of the invention, shown with a lever connected between the load receiving part and a flexible wall.

The invention will now be described in further details with reference to FIG. 2, showing the basic invention where the elastic body includes the base end 1, the two beams 2, the load receiving part 3, and furthermore a sensor cavity, being adapted for mounting sensor means and comprising a flexible wall 5.

Preferably, as shown in FIG. 2, the sensor cavity is placed in the base end 1.

The third beam 4, which in the invention acts as a lever 4, is furthermore connecting the flexible wall 5 to the load receiving part 3 of the load cell.

The beams 2, which are stiff in the middle part, but are provided with the flexible ends 6, tie together the base end 1 and the load receiving part 3, whereby the part 3 is restricted to parallel displacements, even when the force P is applied very eccentric.

This design, which makes the load cell insensitive to where the load is applied; is a prerequisite for precision measurements with load cells.

The cover 7 closes the sensor cavity with the flexible wall 5, and the cable 8 for 30 conducting power and signals to and from the sensor may be mounted in the cover 7.

Figure 3:
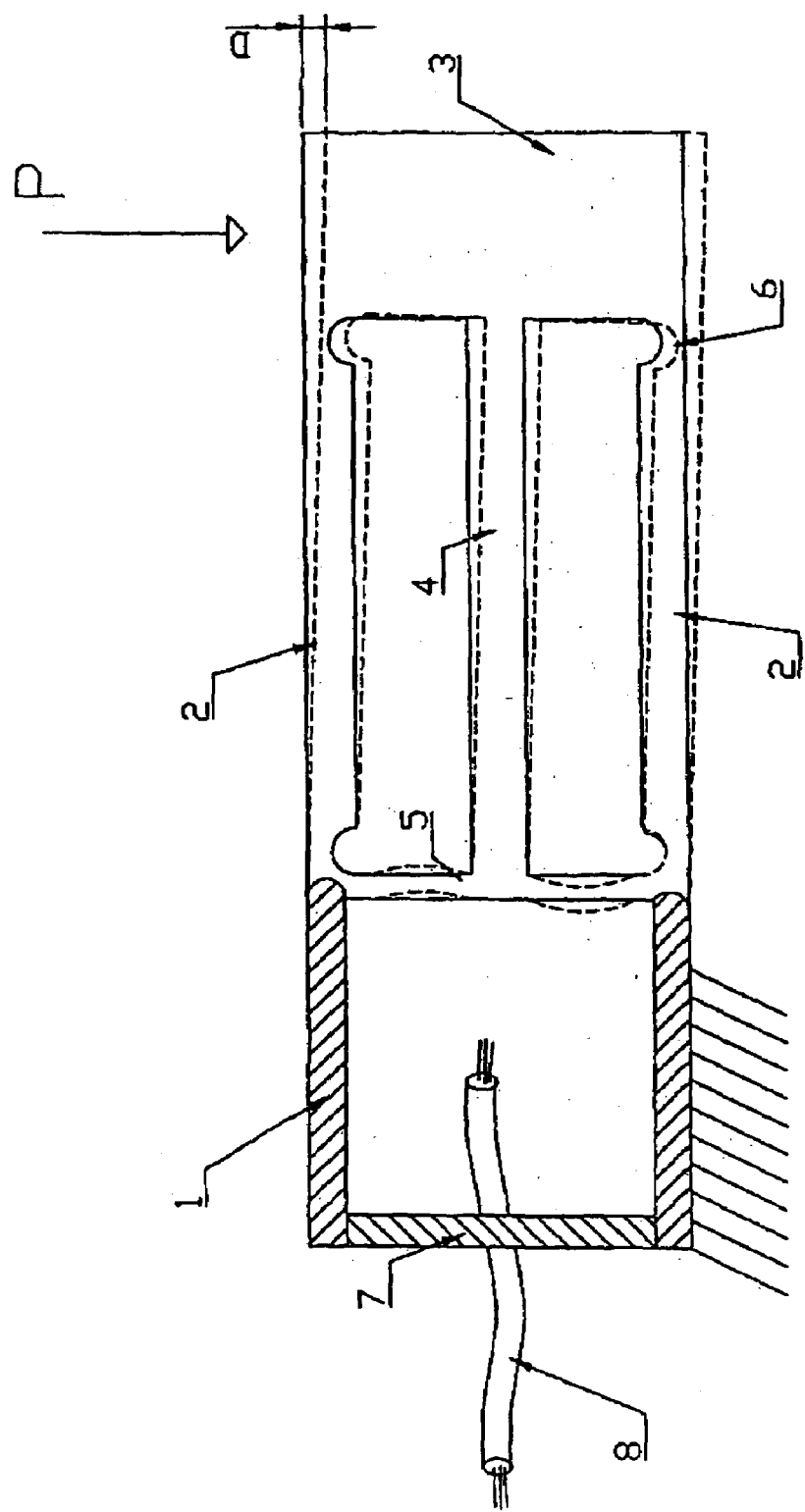
FIG. 3 shows the deformation of the different parts of the basic embodiment of FIG. 2, exaggerated for clearness.

FIG. 3 shows the displacement D of the load receiving part 3, the angular movement of the beams 2 and the lever 4 and the deformations of the flexible wall 5, when a load P is applied.

All displacements and deformations are shown exaggerated for clearness.

It is important for the precision of the load cell according to the invention that the elastic properties and the stiffness of the load cell is determined all most entirely by the dimensions of the flexible wall, and also very important that the stiffness of the flexible parts 6 of the beams 2 is all most negligible.

Figure 4:
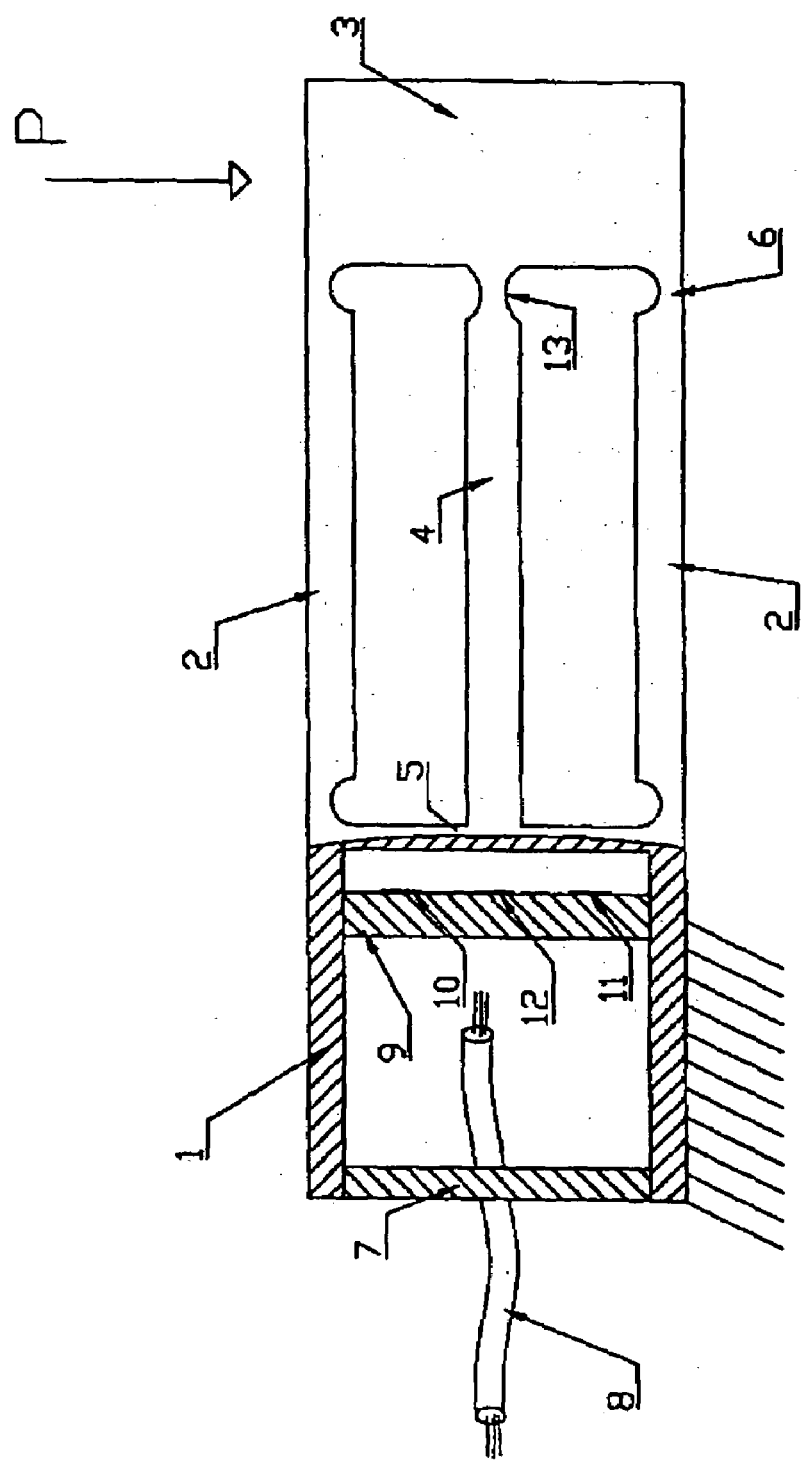
FIG. 4 is an embodiment of the invention, showing capacitive or inductive sensor means for measuring the deformations of the flexible wall.

FIG. 4 shows the basic invention with a capacitive sensor in the sensor cavity consisting of the sensor carrier 9, which could be a ceramic disc, with the displacement sensing electrodes 10 and 11 placed at a distance from, and facing the flexible wall 5, preferably where the deformations are at a maximum. An optional reference electrode 12 is shown placed in the middle of the sensor carrier where the average displacement of the flexible wall is at a minimum, or it could alternatively be placed at the outer perimeter of the sensor carrier 9, where the displacement is essentially zero The capacitor electrodes maybe connected to a capacitance measuring circuit mounted on the rear side of the sensor carrier 9.

This circuit could, for example, be according to U.S. Pat. No. 4,737,706

Instead of the capacitor electrodes, inductive sensors in the form of small coils may be placed preferably at the same positions on the sensor carrier 9, as shown for the capacitor electrodes.

A circuit sensing the variations in the inductance of the coils or sensing the eddy current effects, when the flexible wall is displaced as a result of the force to be measured, could be placed on the rear side of the sensor carrier 9.

The lever 4 has preferably, in all embodiments of the invention, a thinner cross section 13, which normally, is placed at the end where the lever is fastened at the part 3 of the elastic body, whereby the deformations of the flexible wall 5 is increased, for a certain displacement of the part 3.

Figure 5:
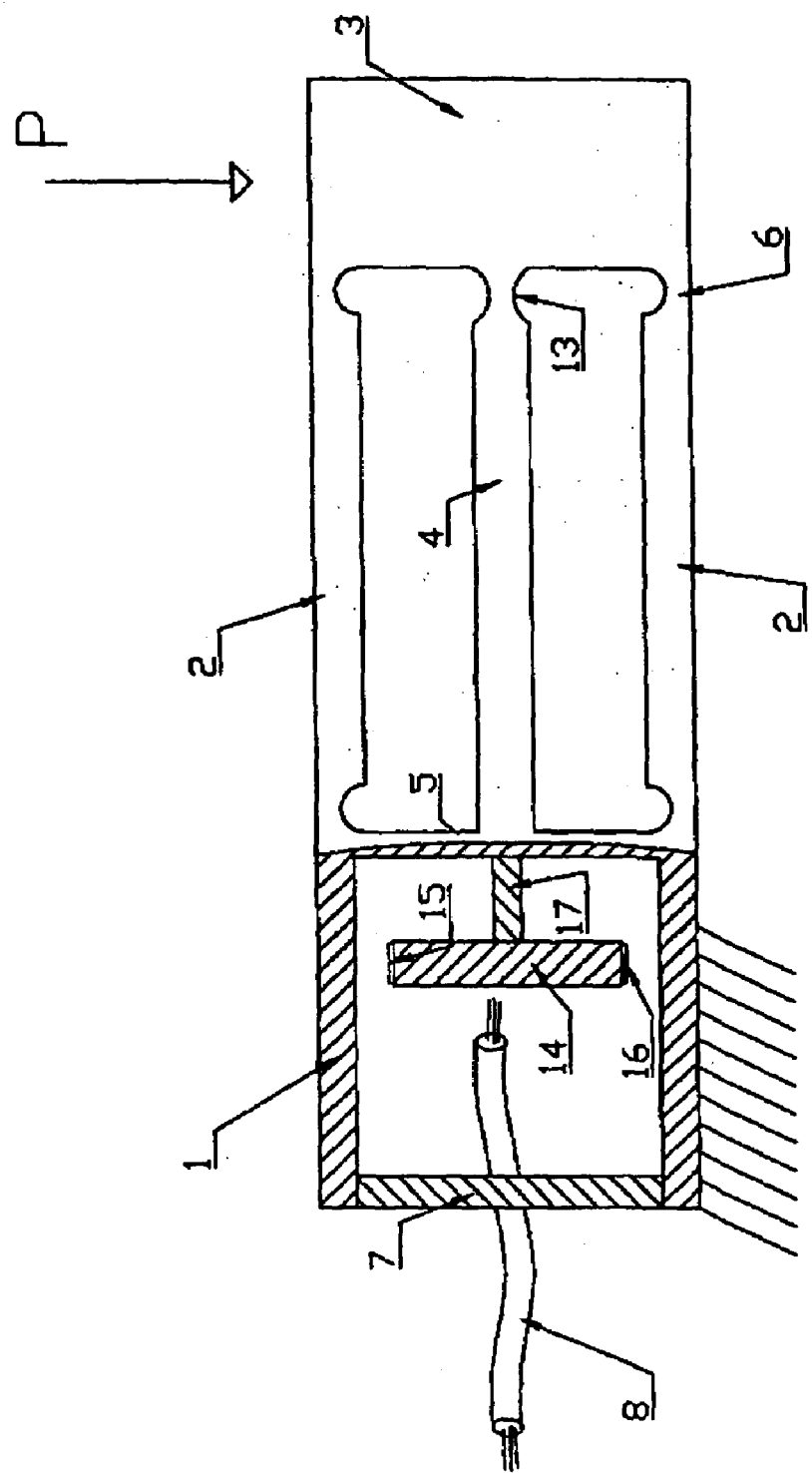
FIG. 5 is an embodiment of the invention, showing a second type of capacitive or inductive sensor means for measuring displacements derived from the deformations of the flexible wall.
Figure 6:
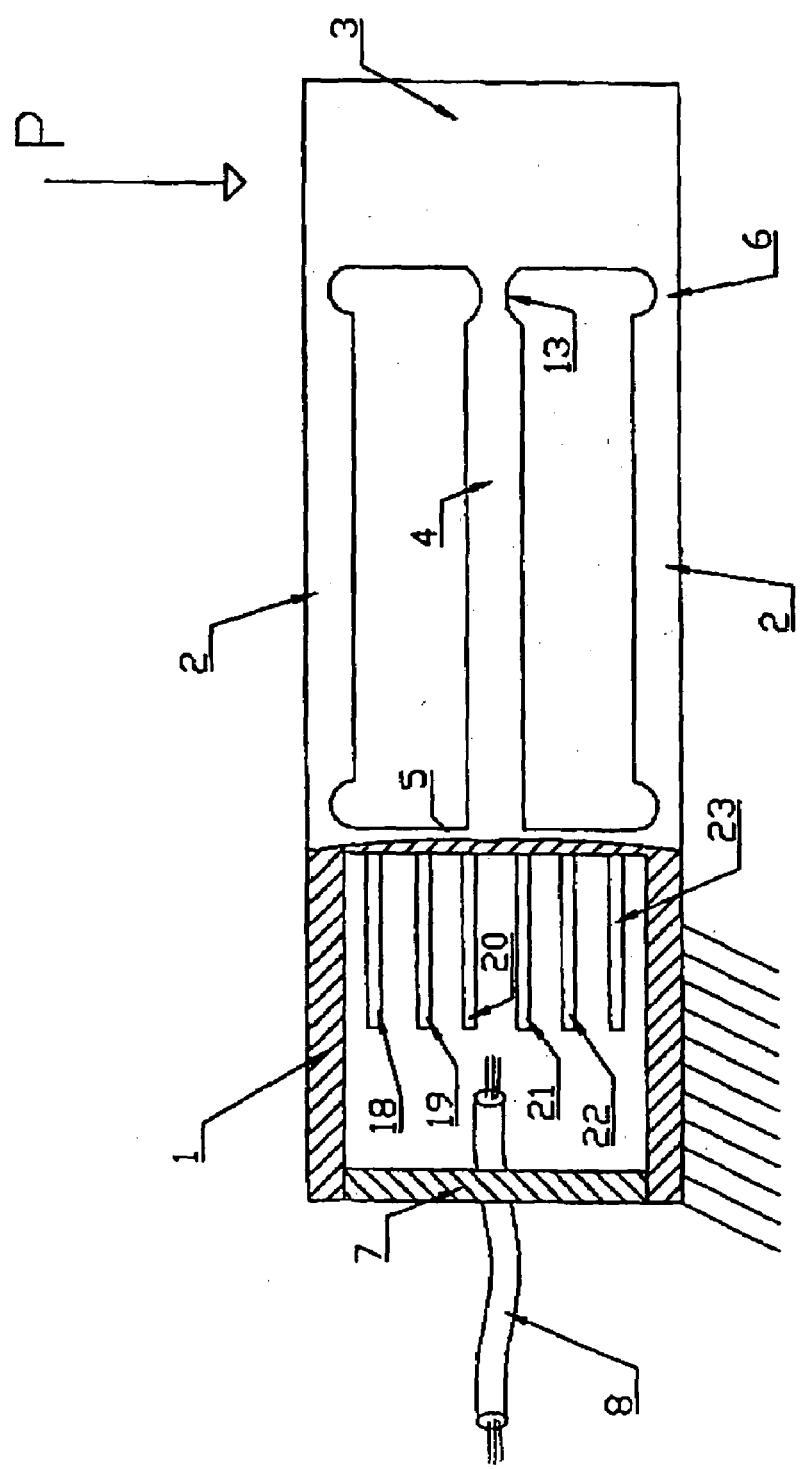
FIG. 6 is an embodiment of the invention, showing a third type of capacitive or inductive sensor means for measuring the deformations of the flexible wall.

FIG. 5 shows the basic invention with another capacitive sensor comprising the sensor carrier 14, with capacitor electrodes 15 and 16, with the sensor carrier mounted on a stud 17, which could be an extension of the lever 4.

It is readily seen that a displacement of the load receiving part 3, by the action of the lever 4, is transformed into a deformation of the flexible wall 5, which again, by the stud 17, is transformed in changes of distance of the capacitor electrodes 15 and 16 to the inner walls of the sensor cavity.

Also in this embodiment of the invention, the capacitor electrodes may be substituted by same widths as the fins.

Figure 8:
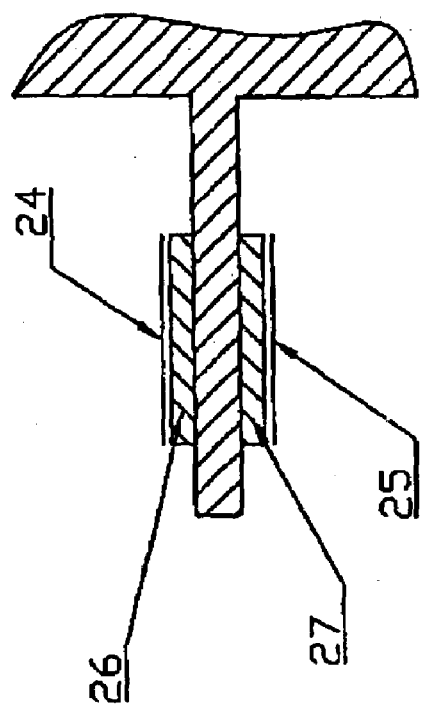
FIG. 8 is an example of capacitor electrodes placed on fins fastened to the flexible wall.
Figure 7:
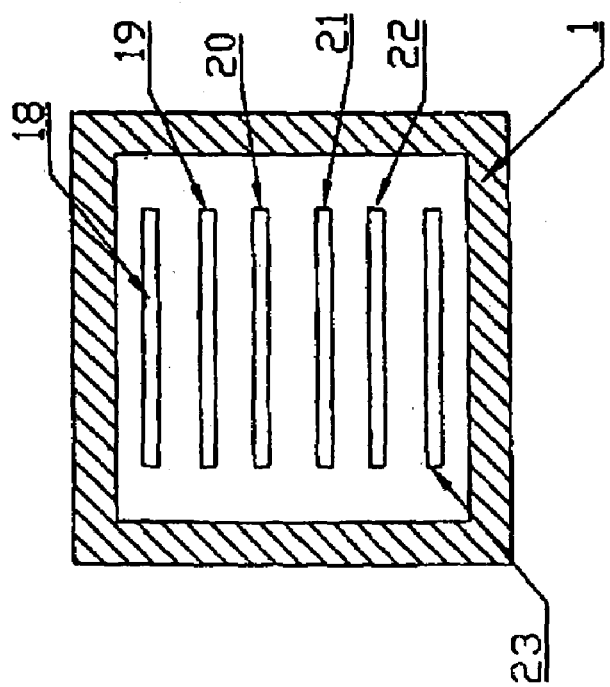
FIG. 7 is the sensor system of FIG. 6, seen perpendicular to the flexible wall.

In FIG. 8, a fin is shown with the capacitor electrodes 24 and 25 mounted on the insulating layers, 26 and 27.

If for example the fins 19 and 22 are fitted with capacitance electrodes according to FIG. 8 and the fins 18,20,21 and 23 are grounded, the deformations of the flexible wall 5, as demonstrated in FIG. 3, are seen to increase both the capacitances of the electrodes on fin 19, while decreasing the capacitances of the electrodes on fin 22.

According to the invention the number of fins may be increased or decreased, and for example the fins 20 and 21 may be combined in one fin.

Likewise capacitor electrodes may also be placed at one or both sides at any number of the fins.

If for example the fins 18 and 23 are fitted with electrodes according to FIG. 8, one electrode on each fin will increase while the other will decrease, because the inner walls together with fins 19 and 22 are acting as counter electrodes.

Likewise fins 20 and 21 may be fitted with electrodes according to FIG. 8, and a 30 grounded fin may be placed between fin 20 and 21.

Also in this embodiment of the invention, the capacitor electrodes may be substituted by inductive sensors.

Figure 9:
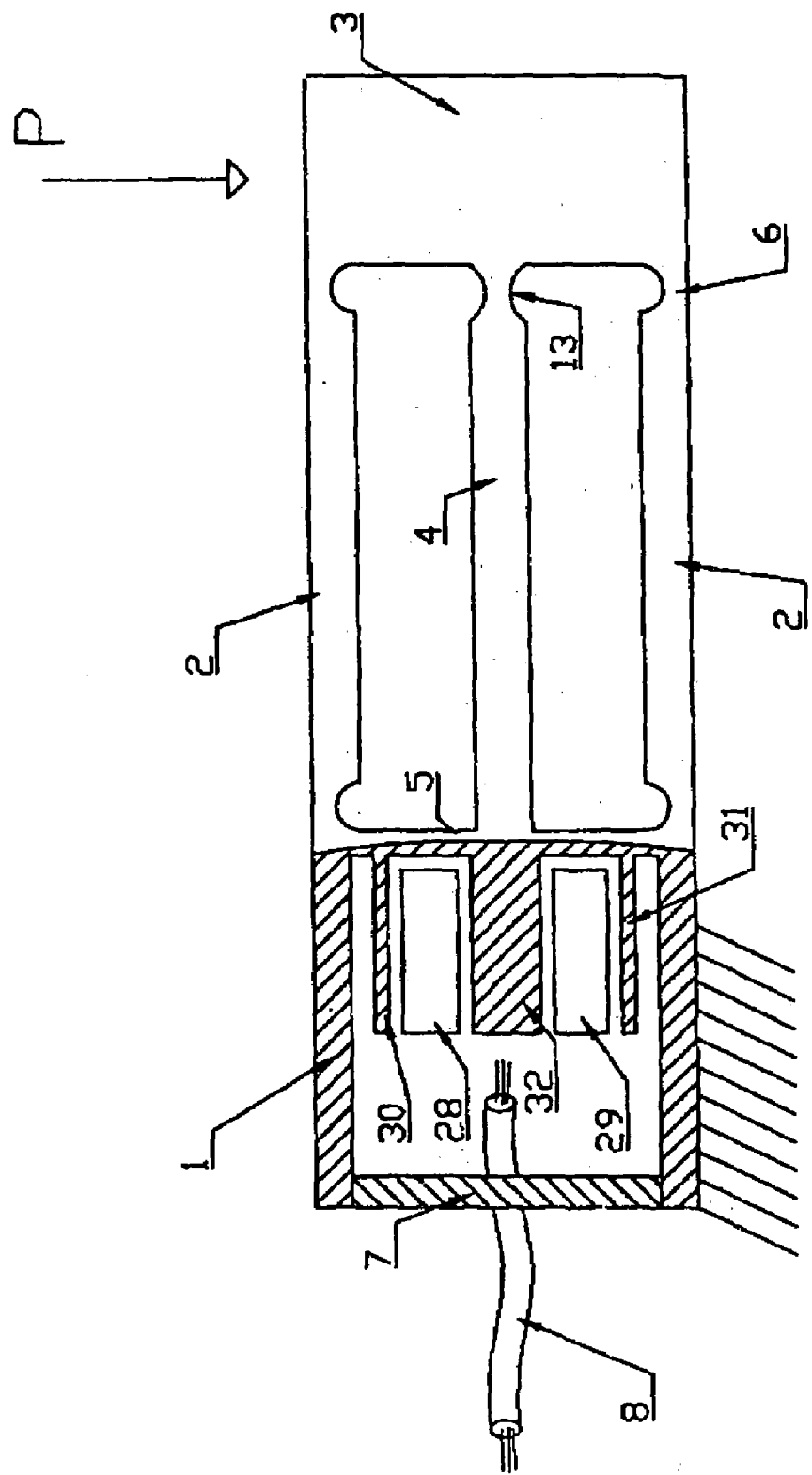
FIG. 9 shows, as an example, capacitor electrodes mounted between fins fastened to the flexible wall.

In the preferred embodiment of the invention, shown in FIG. 9, separate measuring electrodes 28 and 29 are placed between the fins and preferably, but not necessarily, mounted in a fixed position in relation to the flexible wall 5, or in a fixed position in relation to the inner wall of the sensor cavity.

By placing the fins 30 and 31 in positions of the flexible wall 5, where it undergoes suitable deformations, the effect may be obtained that while the fin 32, which could be an extension of the lever 4, is diminishing its'-distance to the electrode 28, when a load or force P is applied, the advantageously placed fin 30 may also see its distance to electrode 28 decreasing when the wall is deformed.

Likewise the electrode 29 will see the distances to the fin 32 and the fin 31 increasing.

Also in this embodiment of the invention, the capacitor electrodes may be substituted by inductive sensors.

The advantage by all embodiments according to the invention, which does not, use the inner wall of the cavity as a counter electrode, but other electrodes on for example the fins or separately mounted electrodes, is that distortions of the walls of the sensor cavity, surrounding the flexible wall 5, due for example to mounting stresses on the load cell, does not introduce measuring errors.

Figure 10:
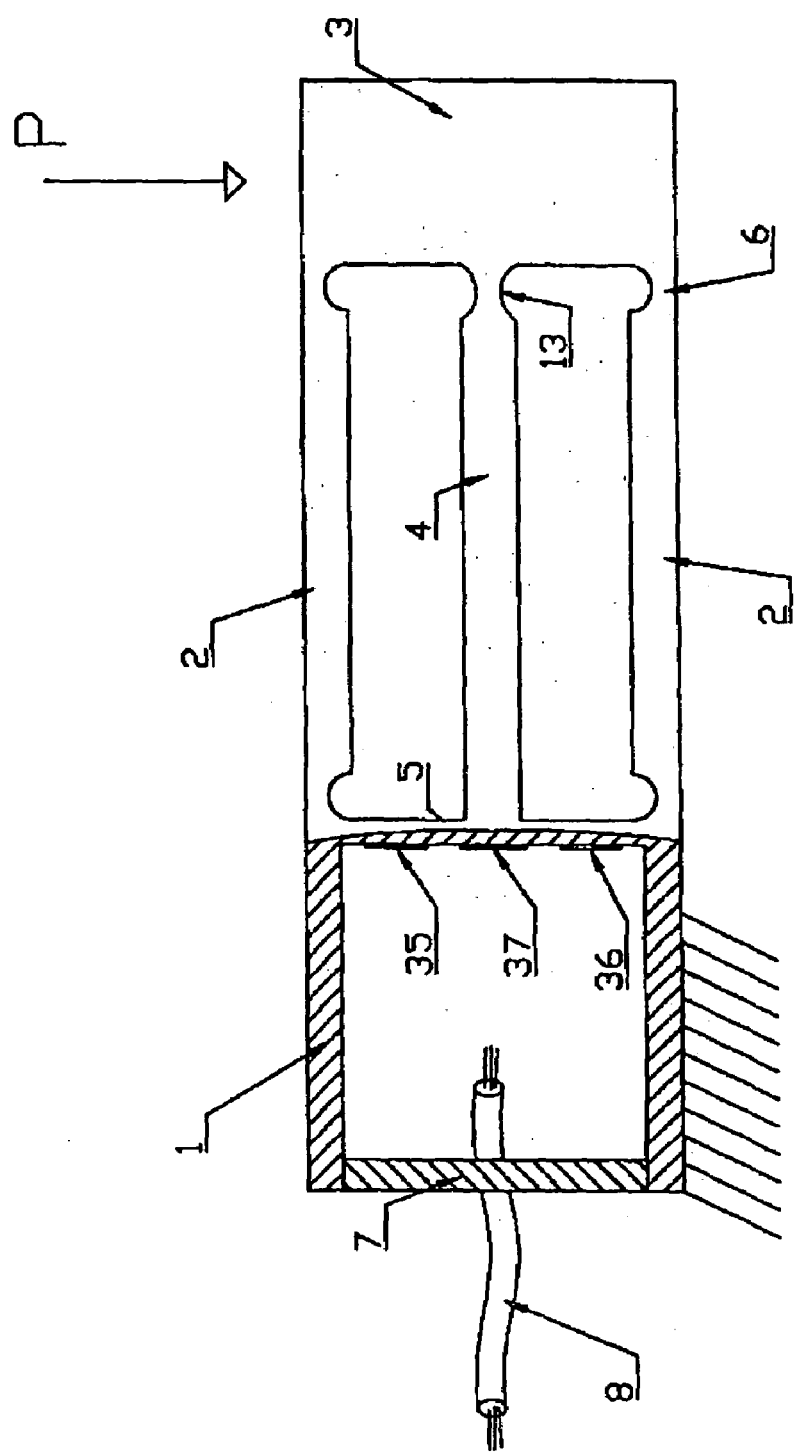
FIG. 10 is an embodiment of the invention, with strain sensors for measuring the deformation of the flexible wall.

FIG. 10 shows the basic invention fitted with strain sensors, which preferably are in the form of the strain gages 35 and 36, and which preferably are placed at the positions where the flexible wall 5 has the maximum deformations and with optionally a reference strain 10 gage 37 at a position with the minimum deformations.

Compared to strain gage load cells of prior art, the strain gage load cell according to the invention has the very important advantage that the strain gages, without any further production steps, are shielded against the environment and has furthermore the added 15 advantage of a very uncomplicated wiring as all gages are applied near each other.

For low cost at high production quantities a special strain gage system with all the gages integrated in one unit could be applied.

The strain in the flexible wall may, according to the invention, also be measures by other strain measuring means such as optical or inductive.

Figure 11:
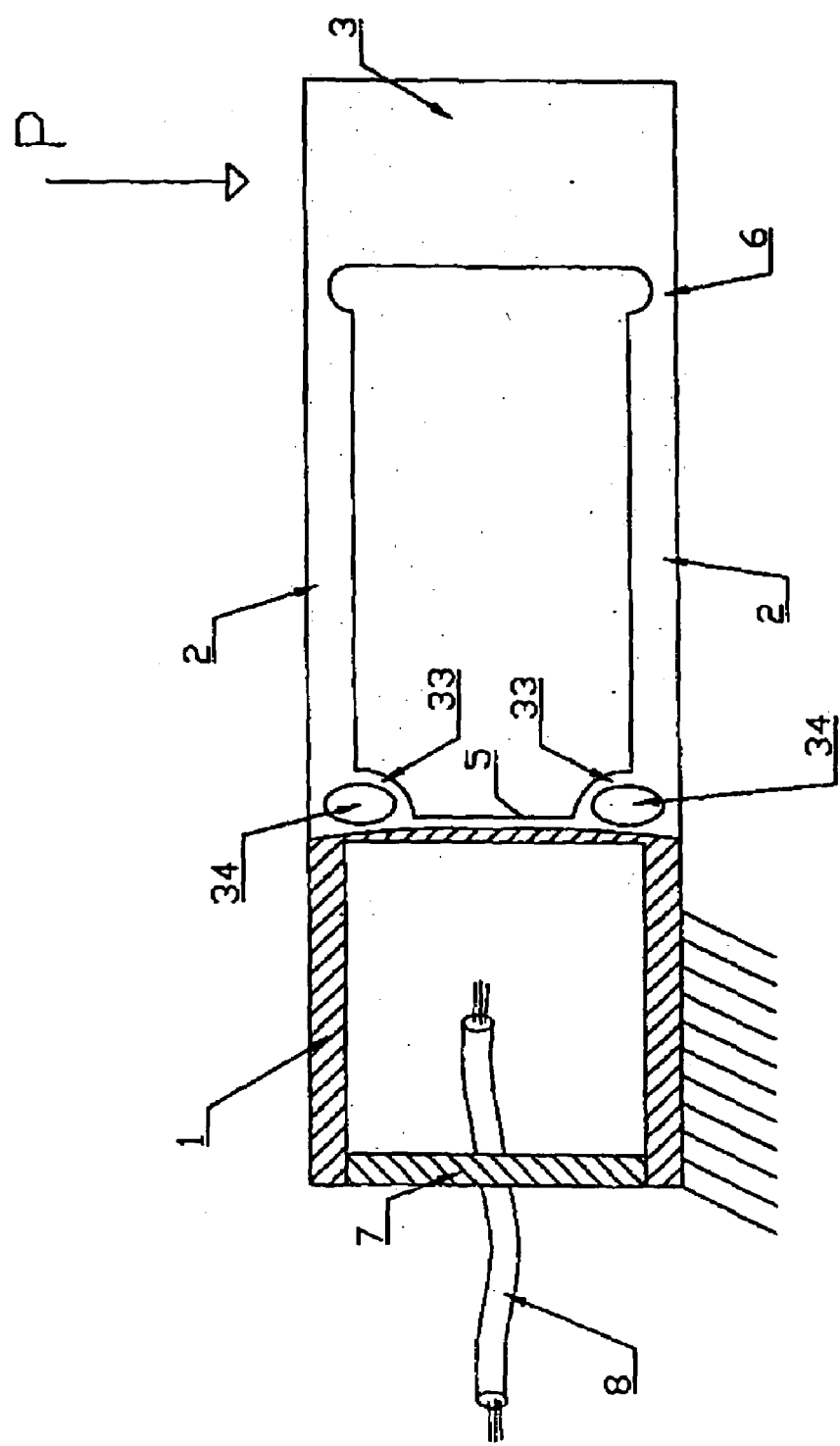
FIG. 11 is an embodiment of the invention, with the beams connecting the base end and the load or force receiving part functioning as the lever acting on the flexible wall.

According to the invention, and as shown in FIG. 11, the function of the lever 4, from the aforementioned embodiments, may be performed by one or both of the levers 33 which could be a part of the beams 2 connecting the base end 1 with the load or force receiving part 3.

To allow the deformations of the flexible wall to take place, holes or slots, which advantageously may be positioned as the holes 34 in FIG. 11, are machined in the base end 1.

Figure 12:
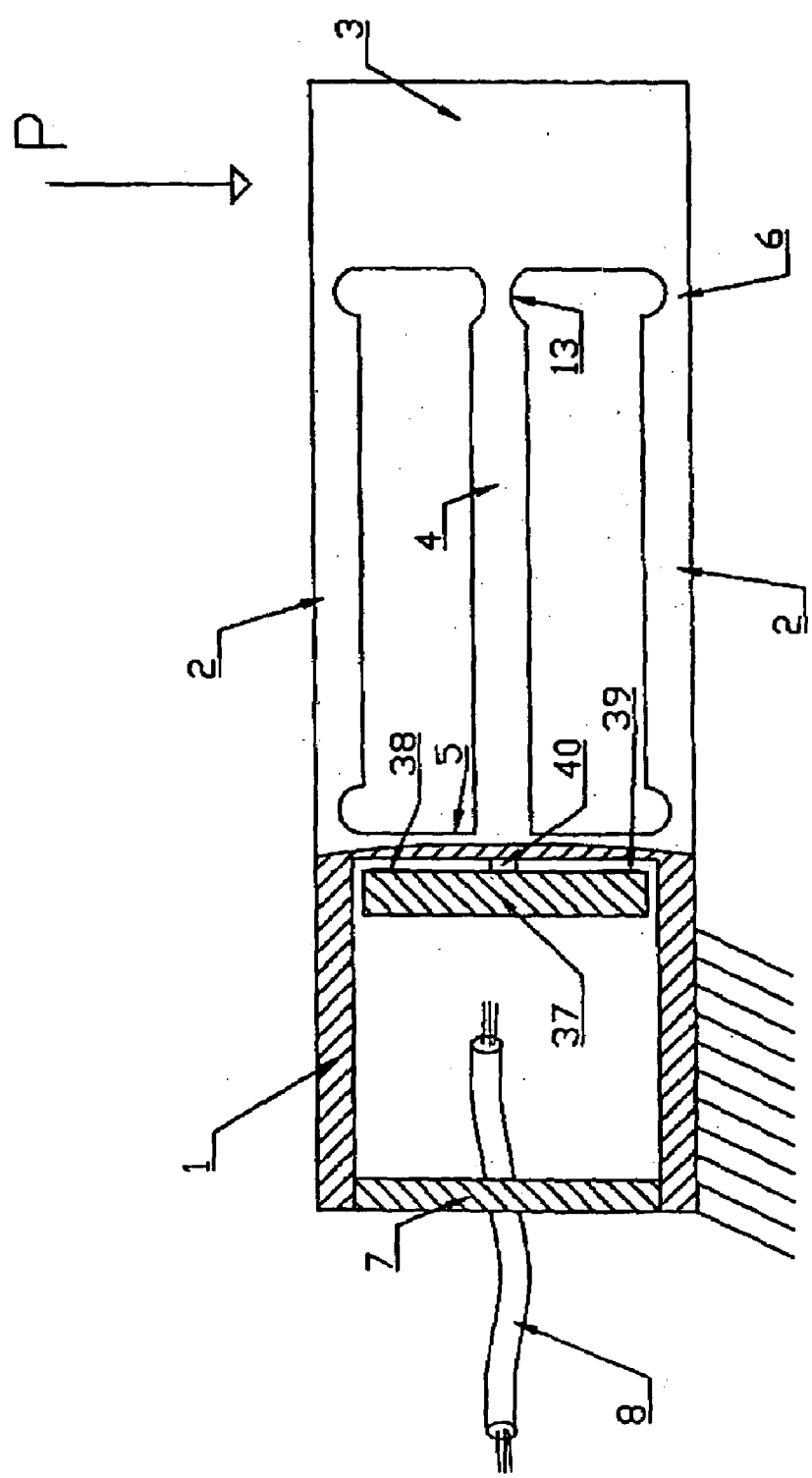
FIG. 12 is an embodiment of the invention, showing another type of capacitive or inductive sensor means for measuring the deformations of the flexible wall.

Alternatively, as shown in FIG. 12, an electrode carrier 37 with sensors 38 and 39, facing the flexible wall 5 may be mounted on a short stud or fin 40.

The deformation of the flexible wall 5, through the action of the lever 4, is measured by the changes of distance between the sensors or electrodes 38 and 39, and the flexible wall 5.

Figure 13:
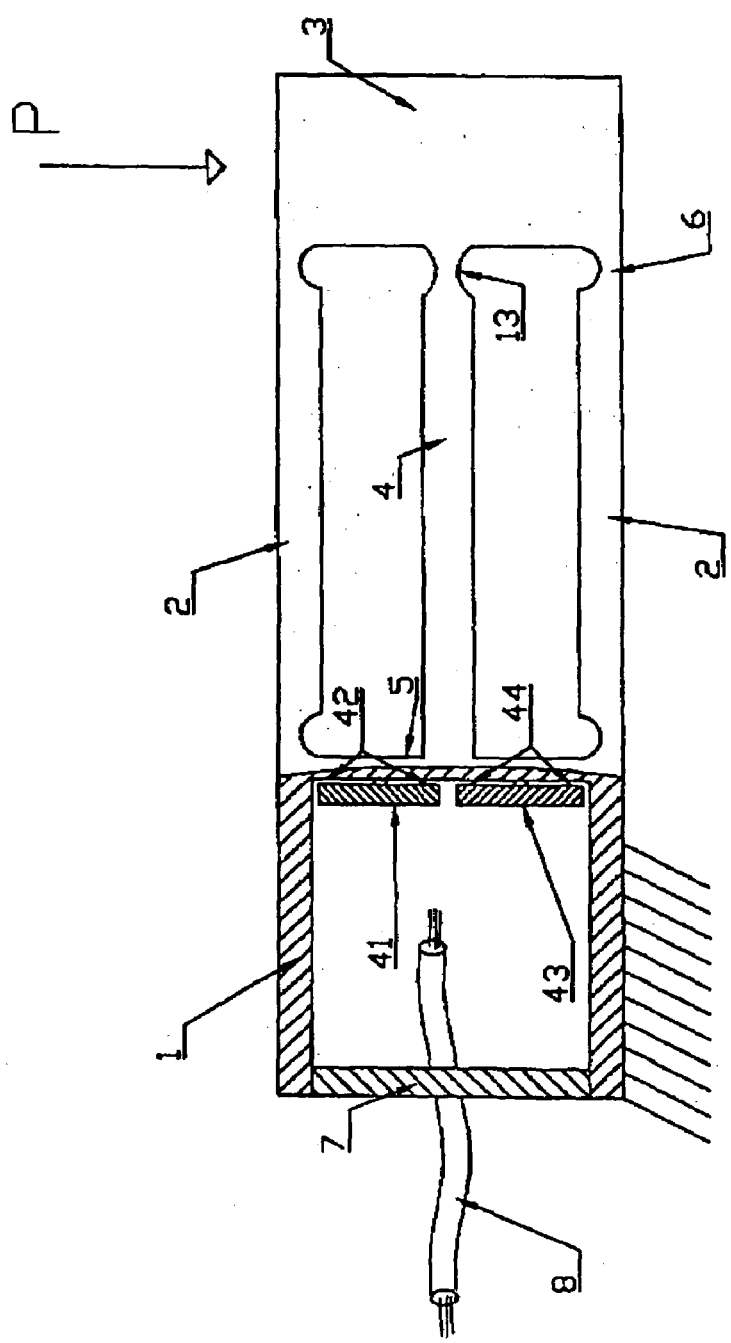
FIG. 13 is an embodiment of the invention, showing still another type of capacitive or inductive sensor means for measuring the deformations of the flexible wall.

Another arrangement, according to the invention, is shown in FIG. 13, with two sensor or electrode carriers 41 and 43, mounted separately on studs or ribs at advantageously placed positions on the flexible wall 5 and with the electrodes 42 and 44, facing the flexible wall.

The electrodes on one sensor carrier will se an increasing and the electrodes on the other sensor carrier a decreasing distance to the flexible wall.

If each sensor carrier is fitted with only one electrode, covering the surface, a tilting of the electrode carrier on the short stud will produce only a small error as the decreasing distance at one end of the electrode carrier will largely be compensated by a corresponding increasing distance at the opposite end of the electrode carrier.

Figure 14:
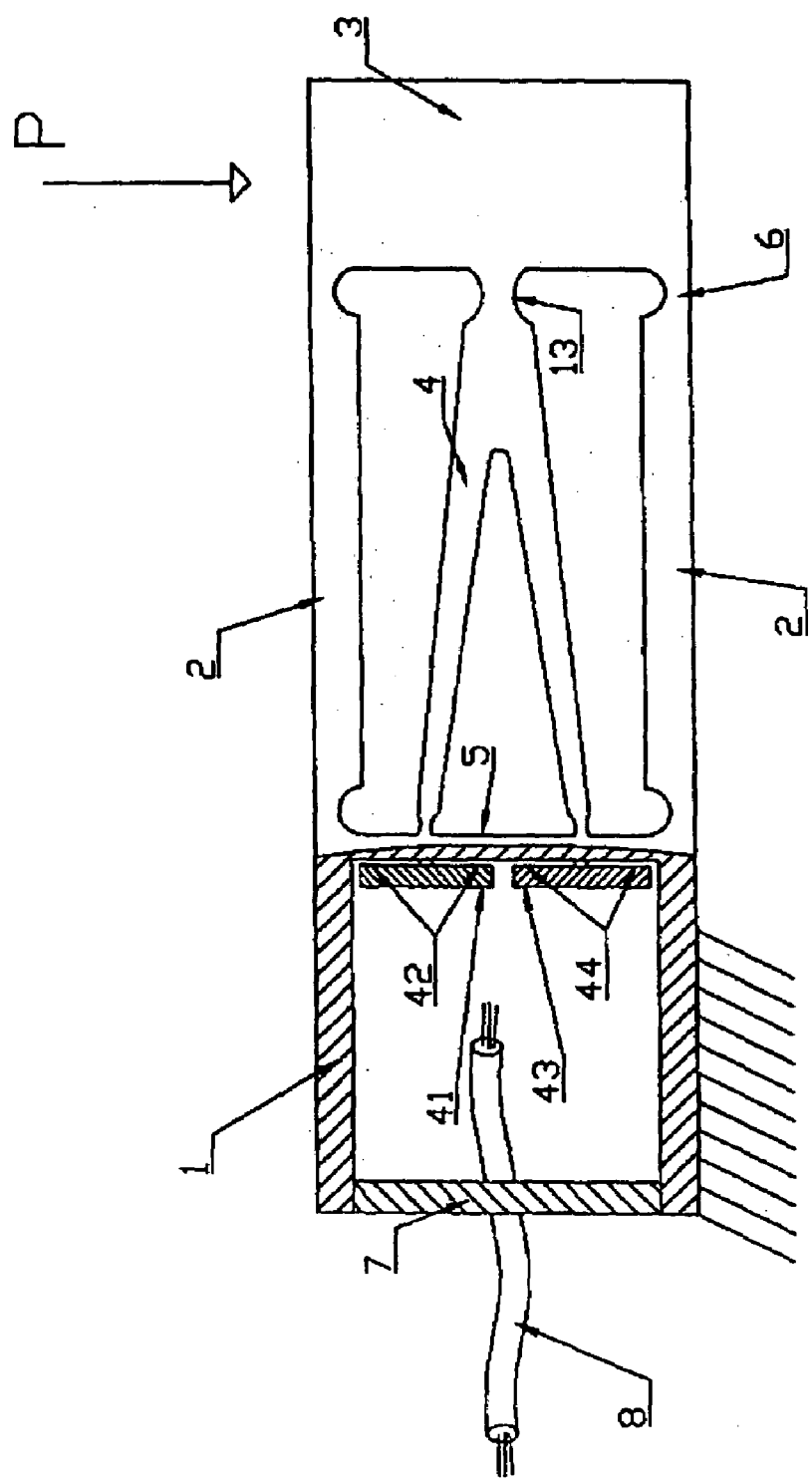
FIG. 14 is an embodiment of the invention of FIG. 13, showing two levers acting on the flexible wall.

The load cell according to FIG. 13 may advantageously, as shown in FIG. 14, have the lever 4 divided into two separate levers, each acting directly on the flexible wall, preferably at the two positions, where the two sensor carriers are mounted on their studs.

Figure 15:
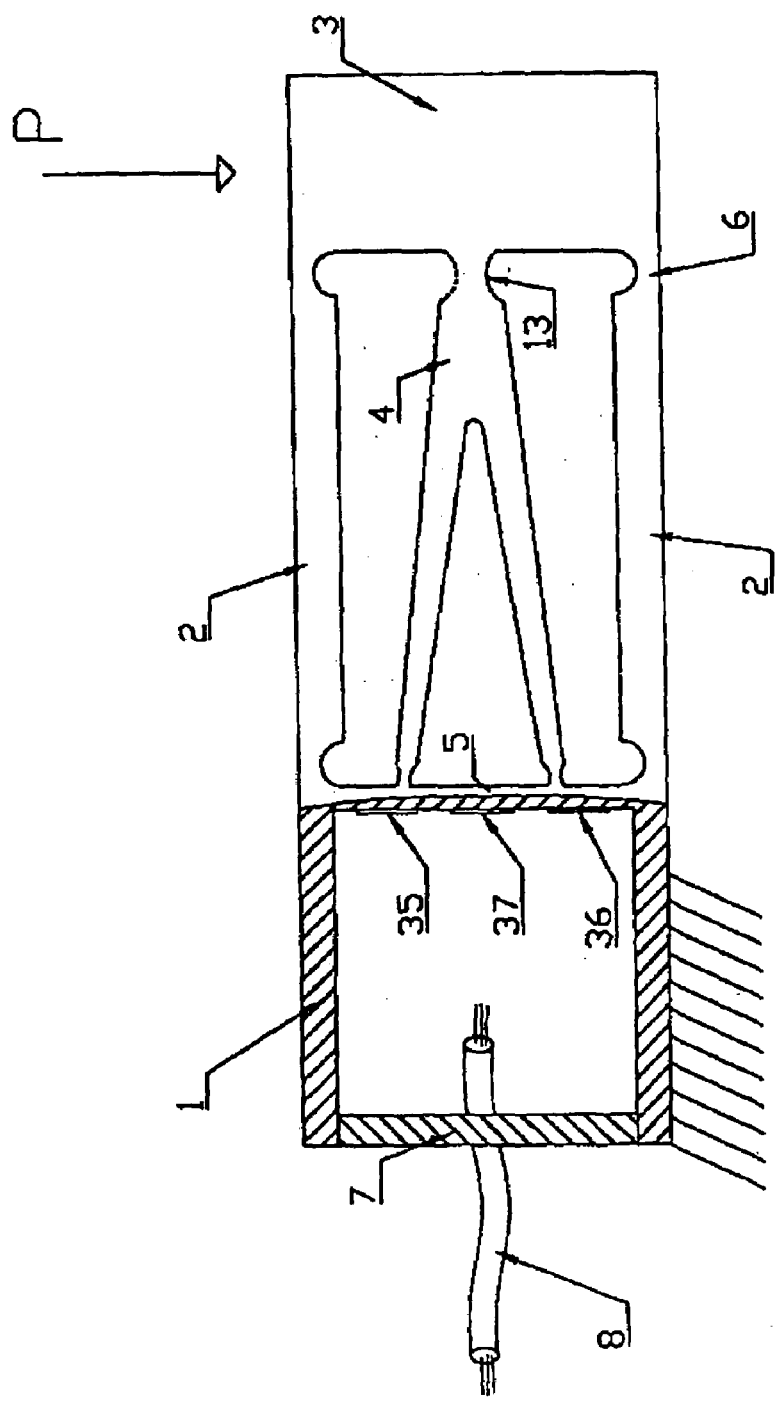
FIG. 15 is an embodiment of the invention of FIG. 10, showing two levers acting on the flexible wall.

Likewise the load cell according to 10, may advantageously, as shown in FIG. 15, have the lever 4 divided into two separate levers, each acting directly on the flexible wall, preferably at the two positions where the highest strain is generated in the strain sensors.

Figure 16:
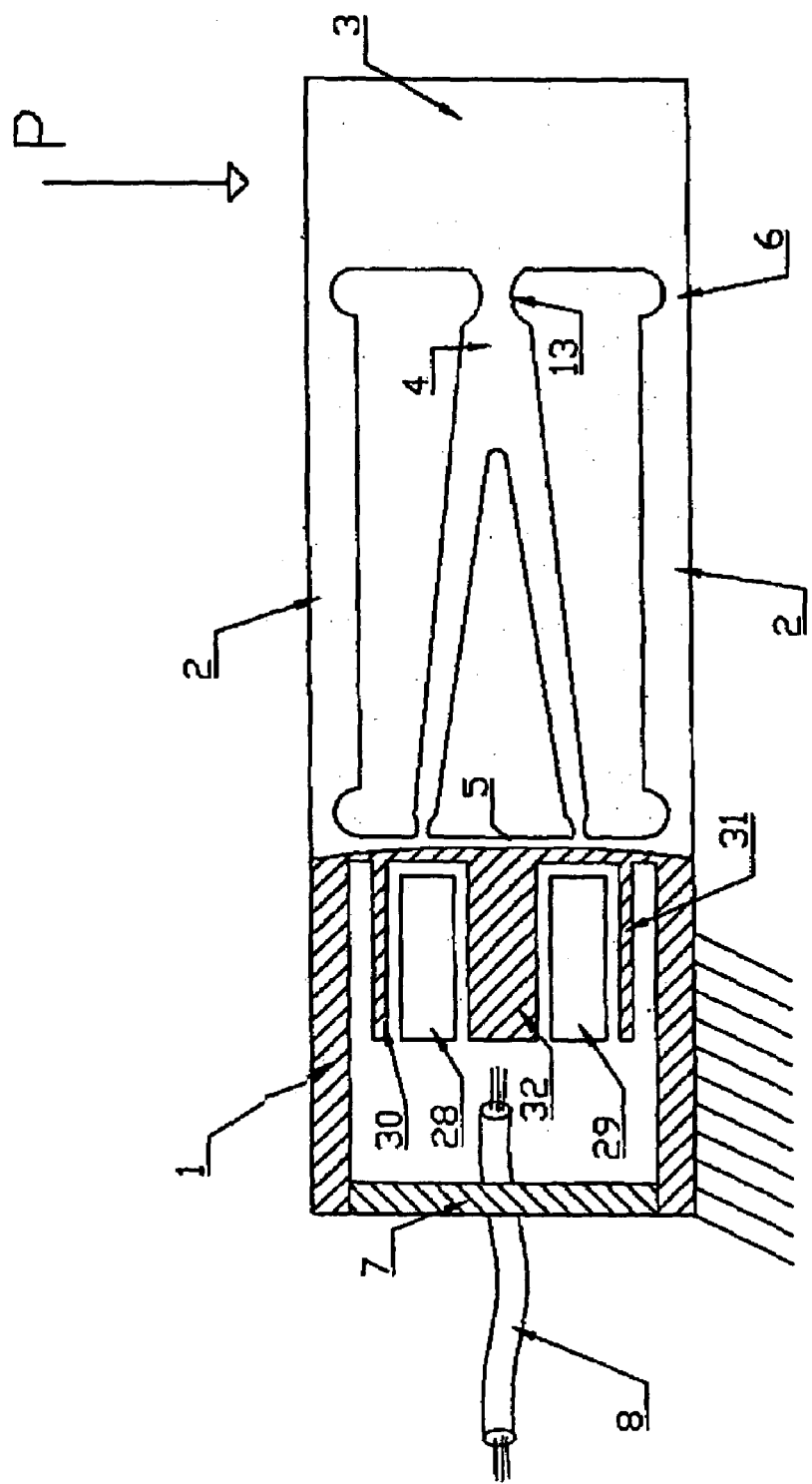
FIG. 16 is an embodiment of the invention of FIG. 9, showing two levers acting on the flexible wall.

The load cell according to FIG. 9, may advantageously, as shown in FIG. 16, have the lever 4 divided into two separate levers, each acting directly on the flexible wall, preferably at the two positions where the maximum deflection of the fins is generated.

Figure 17:
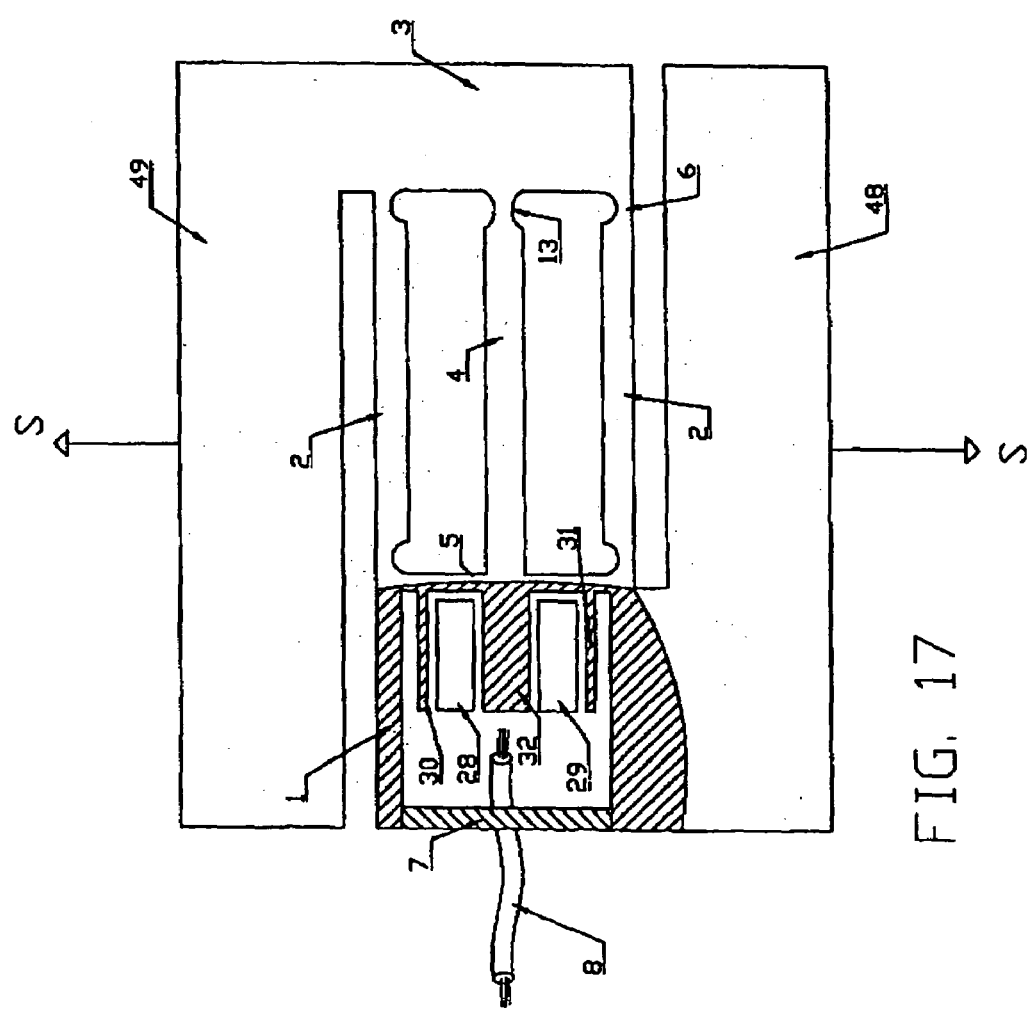
FIG. 17 is an embodiment of the invention, where the load cell is adapted for measuring tension forces and hanging loads.

Load cells according to the invention, may advantageously, as shown in FIG. 17, have 10 the base end 1 and the load receiving part; 3 extended with the parts 48 and 49 respectively, in order to provide load cells of the well known S-type which is ideal for measuring tension forces and hanging loads.

Figure 18:
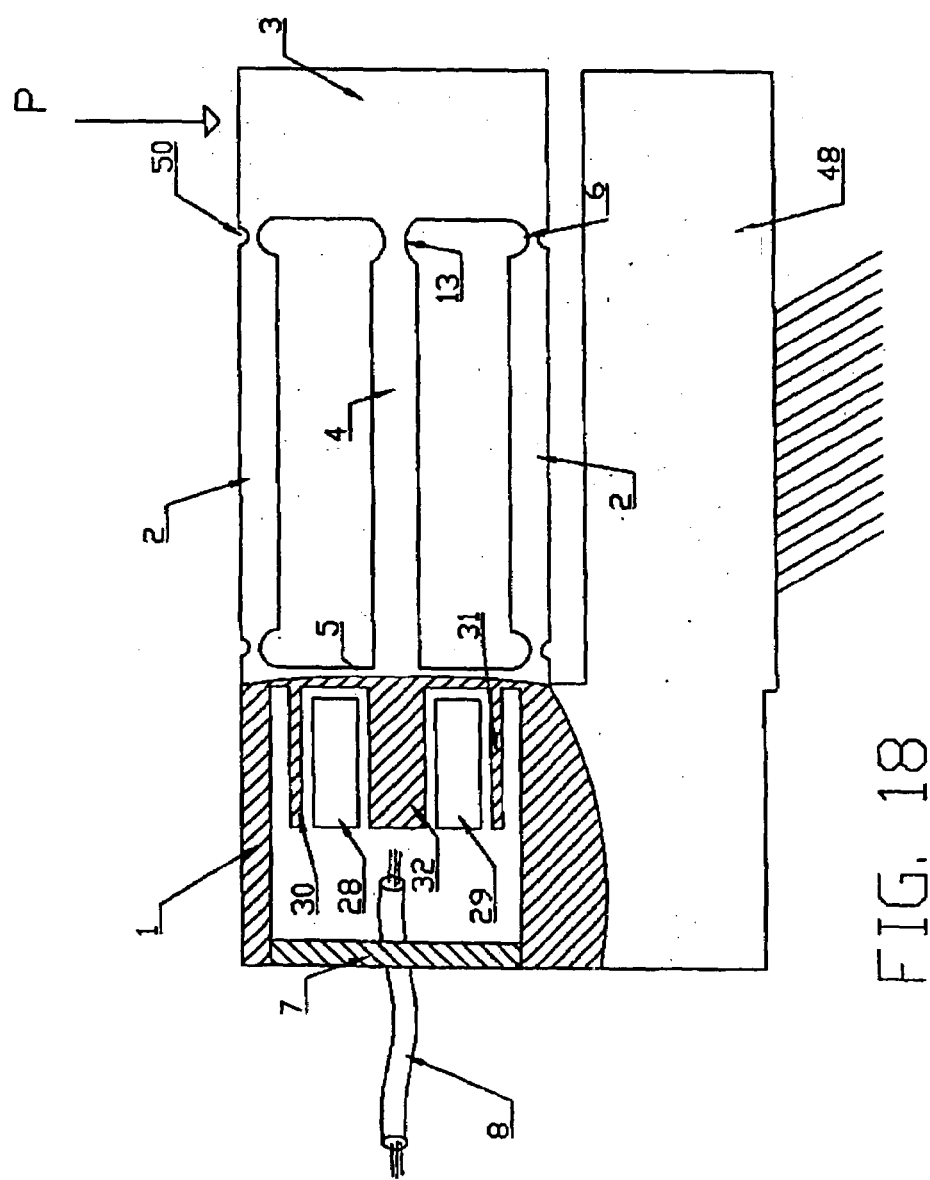
FIG. 18 is an embodiment of the invention, where the load cell is adapted for measuring with high precision, even when mounted on rough surfaces.

The load cell of FIG. 17 is shown with the sensor system of FIG. 9, but any of the sensor systems according to the invention may be applied Load cells according to the invention may also, as shown in FIG. 18, for very high precision measurements, have the base end 1 extended with the part 48, in order to avoid that stresses from mounting the load cell will reach the sensor system.

In order to facilitate the accurate machining of the flexible parts 6 of the beams 2, the grooves 50 at the inside and the outside of the beams are milled at the same time. The load cell of FIG. 18 is shown with the sensor system of FIG. 9, but any, of the sensor systems according to the invention may be applied.

Figure 19:
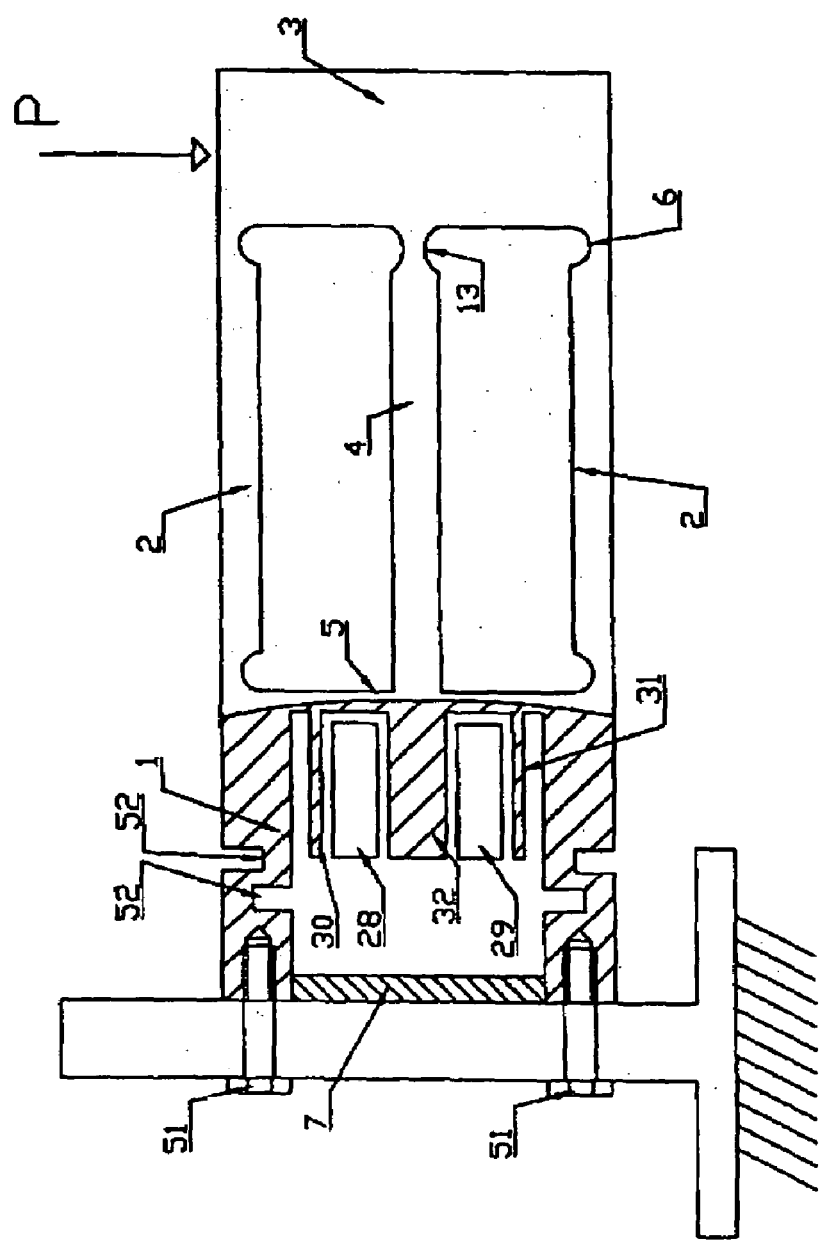
FIG. 19 is an embodiment of the invention, where the load cell is adapted for mounting on vertical surfaces.

In FIG. 19, a load cell according to the invention, is shown with facilities for mounting on a vertical surface.

In order to keep mounting stresses from the bolts 51, reaching the sensor system, grooves 52 may be milled on the inside and the outside surfaces of the sensor cavity.

The load cell of FIG. 19 is shown with the sensor system of FIG. 9, but any of the sensor systems according to the invention may be applied.

Figure 20:
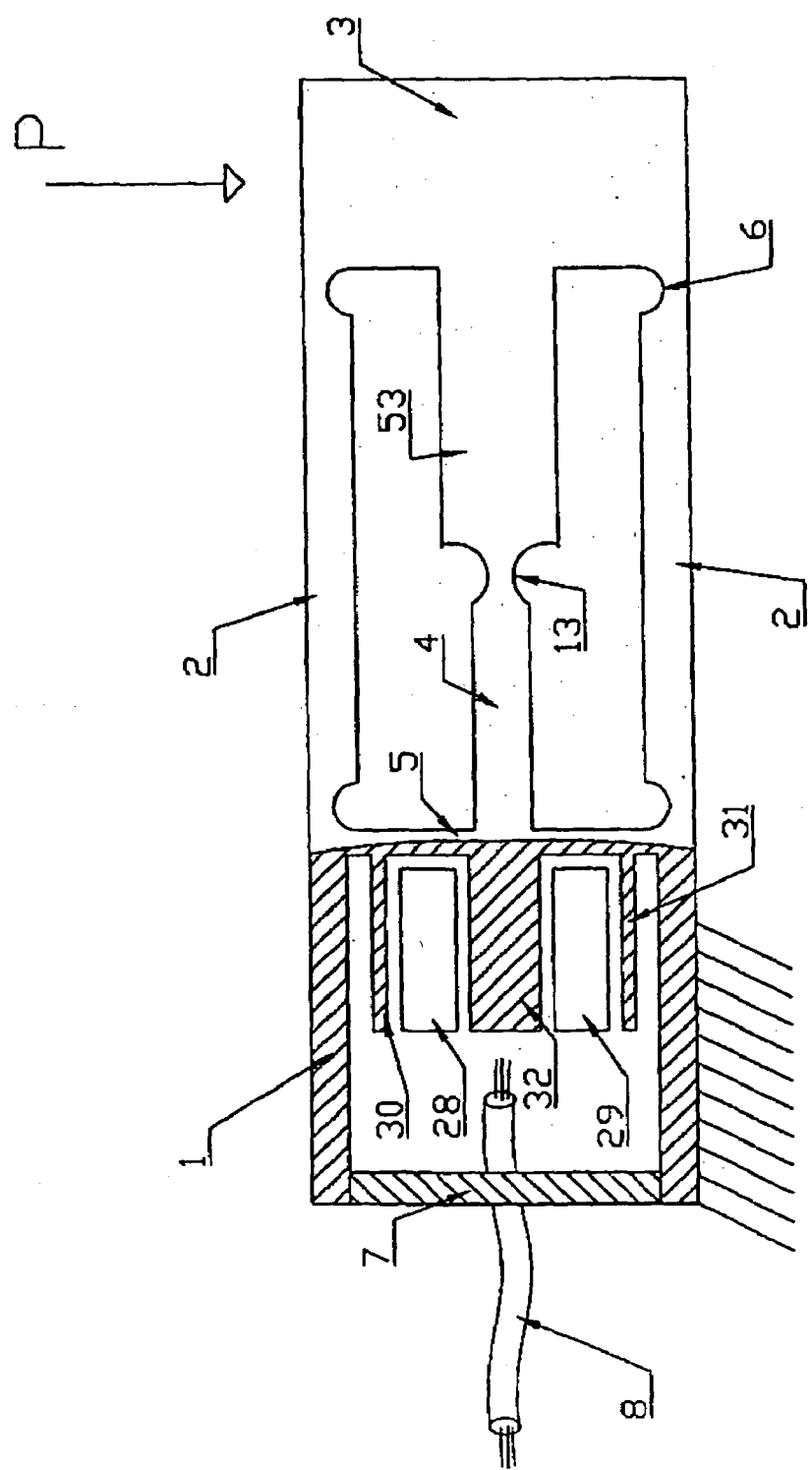
FIG. 20 is an embodiment of the invention, where the load cell may be optimized by varying the active length of the lever.

FIG. 20 shows a load cell according to the invention where the flexible part 13 of the lever 4 is moved from a position at the load receiving part to a position nearer the base end 1 by means of the extension 53.

For the highest precision in the measurements, the beams 2 should have the lowest possible stiffness. This may be obtained either by making the flexible part 6 very thin, which is not ideal because of the reduction in the strength of the part, or alternatively by making the beams 2 long.

When the beams 2 are made longer the lever 4 also becomes longer, which gives a reduction in the deflection of flexible wall for a certain displacement of the load receiving part 3.

As the deflection of the part 3 should be kept low for high speed measurements an optimum may be reached by dimensioning the length of the lever 4 relative to the length of the extension which in connection with the dimensions of the flexible wall 5, determines the capacity of the load cell.

The load cell of FIG. 20 is shown with the sensor system of FIG. 9, but any of the sensor systems according to the invention may be applied.

Figure 21:
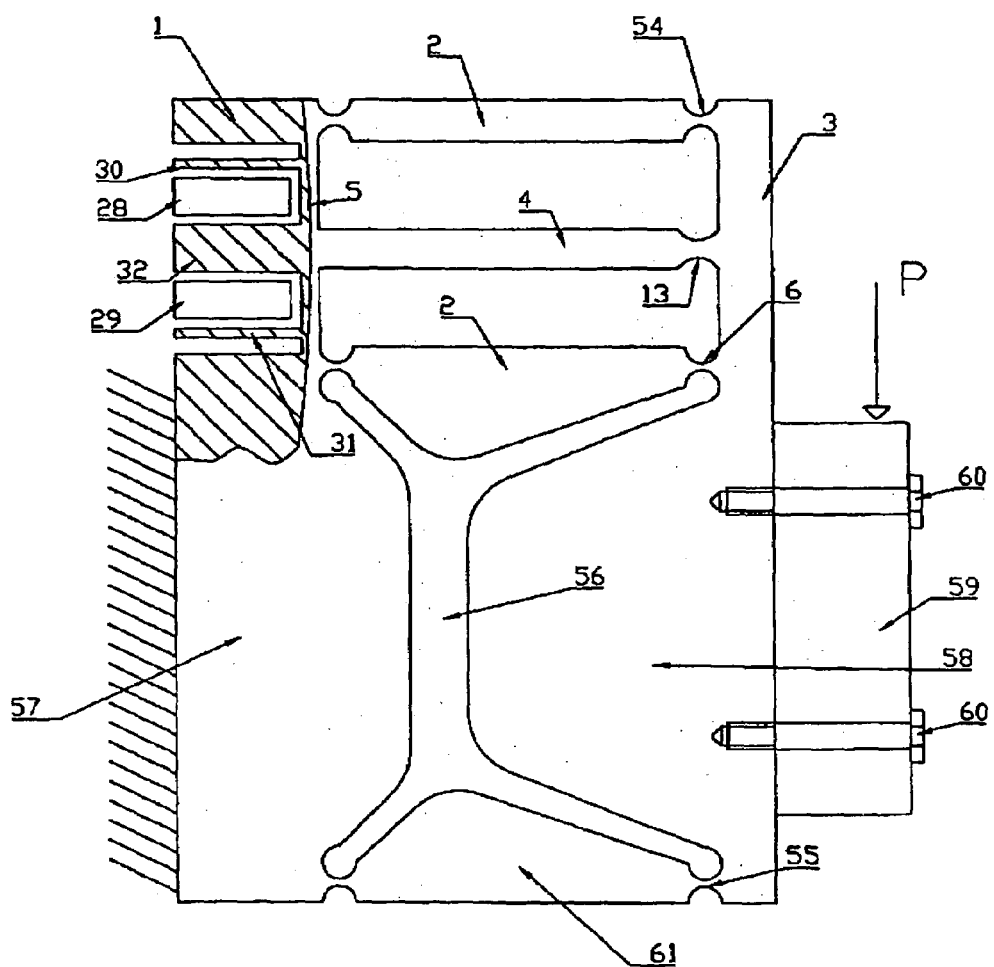
FIG. 21 is an embodiment of the invention, where the load cell is adapted for mounting in robust applications.

A load cell, according to the invention, and shown in FIG. 21 have the solid extensions 57 and 58 of the base end 1 and the load receiving part 3 respectively which facilitates the mounting of the load cell in robust applications.

The load cell body of FIG. 21 is normally produced by milling the beams 2, the lever 4, the flexible portions 6,13, 54 and 55 and the sensor system in the sensor cavity.

The solid extensions 57 and 58 may be produced at a low cost by plasma cutting away the material at 56.

The exterior load receiving part 59 may be bolted to the load cell by the bolts £0 with no interference from the bolt tension, because of the solid dimensions of extensions 57, and likewise the load cell may mounted on the basic construction without interference on the measurement because of the solid extension 58.

The load cell of FIG. 21 is shown with the sensor system of FIG. 9, but any of the sensor systems according to the invention may be applied.

Figure 22:
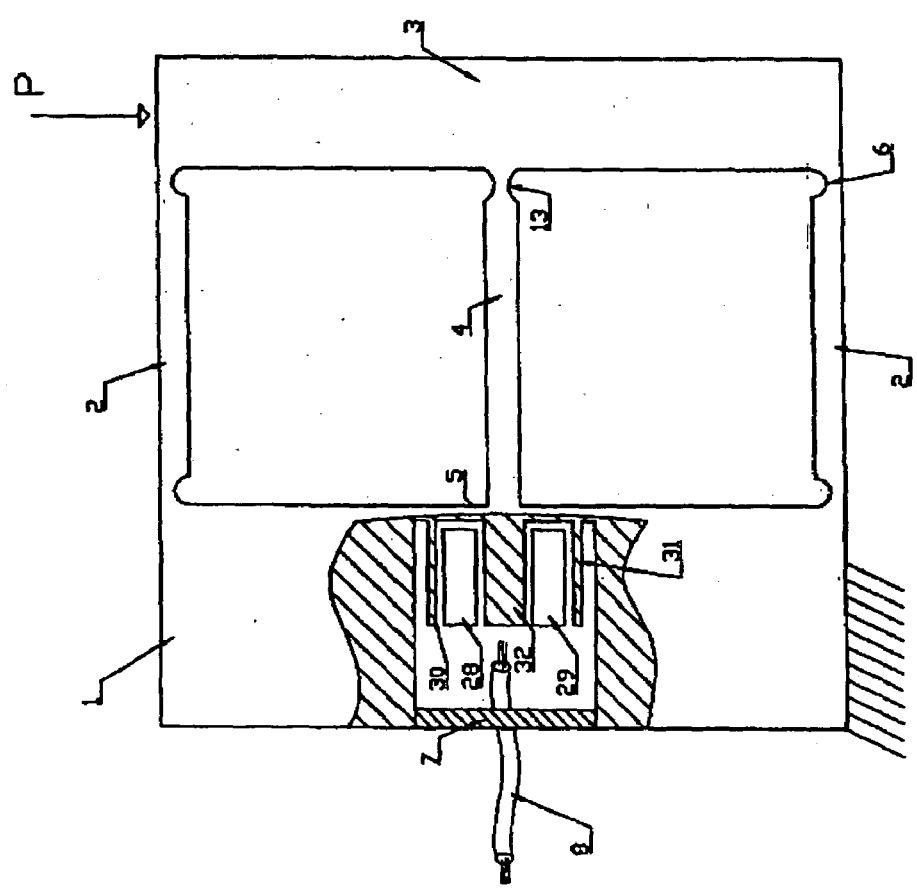
FIG. 22 is an embodiment of the invention, where the load cell is adapted for measuring with very eccentric loads.

In FIG. 22 a load cell according to the inventions is shown, where the distance between the beams 2 is increased in order to reduce the strain in the beams 2 when the load P is applied very eccentrically.

The load cell of FIG. 22 is shown with the sensor system of FIG. 9, but any of the sensor systems according to the invention may be applied.

Figure 23:
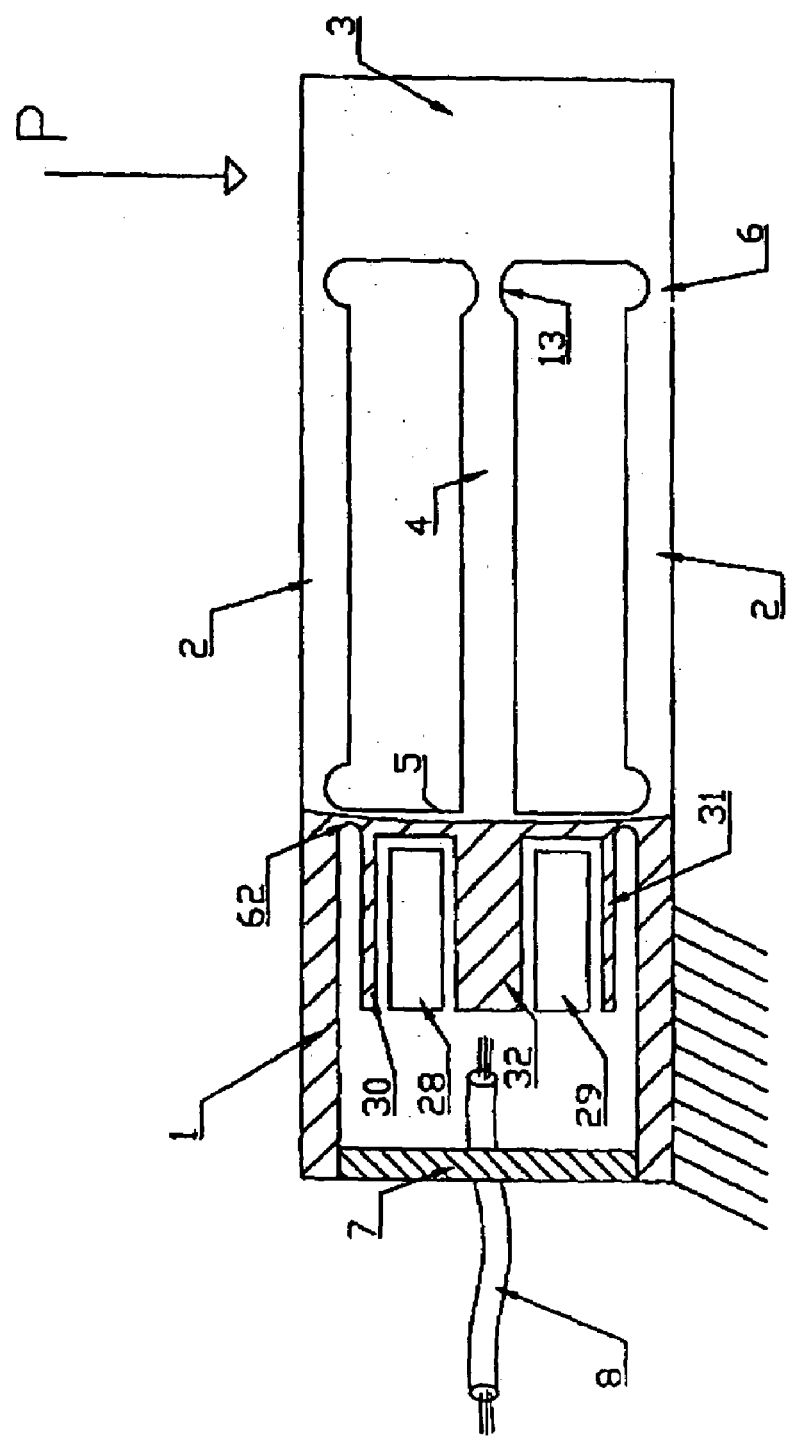
FIG. 23 is an embodiment of the invention, where the flexible wall of a load cell is reduced at the circumference in order to insulate the deformation of the flexible wall from the wall of the sensor cavity.

The flexible wall in the load cell according to the invention, shown in FIG. 23, is reduced at the circumference in order to insulate the deformations of the flexible wall from the wall of the sensor cavity.

This means that the deformation of the flexible wall is all most entirely determined by the dimensions of the flexible wall itself, which is a prerequisite for precision measurements.

The load cell of FIG. 23 is shown with the sensor system of FIG. 9, but any of the sensor systems according to the invention may be applied.

Figure 24:
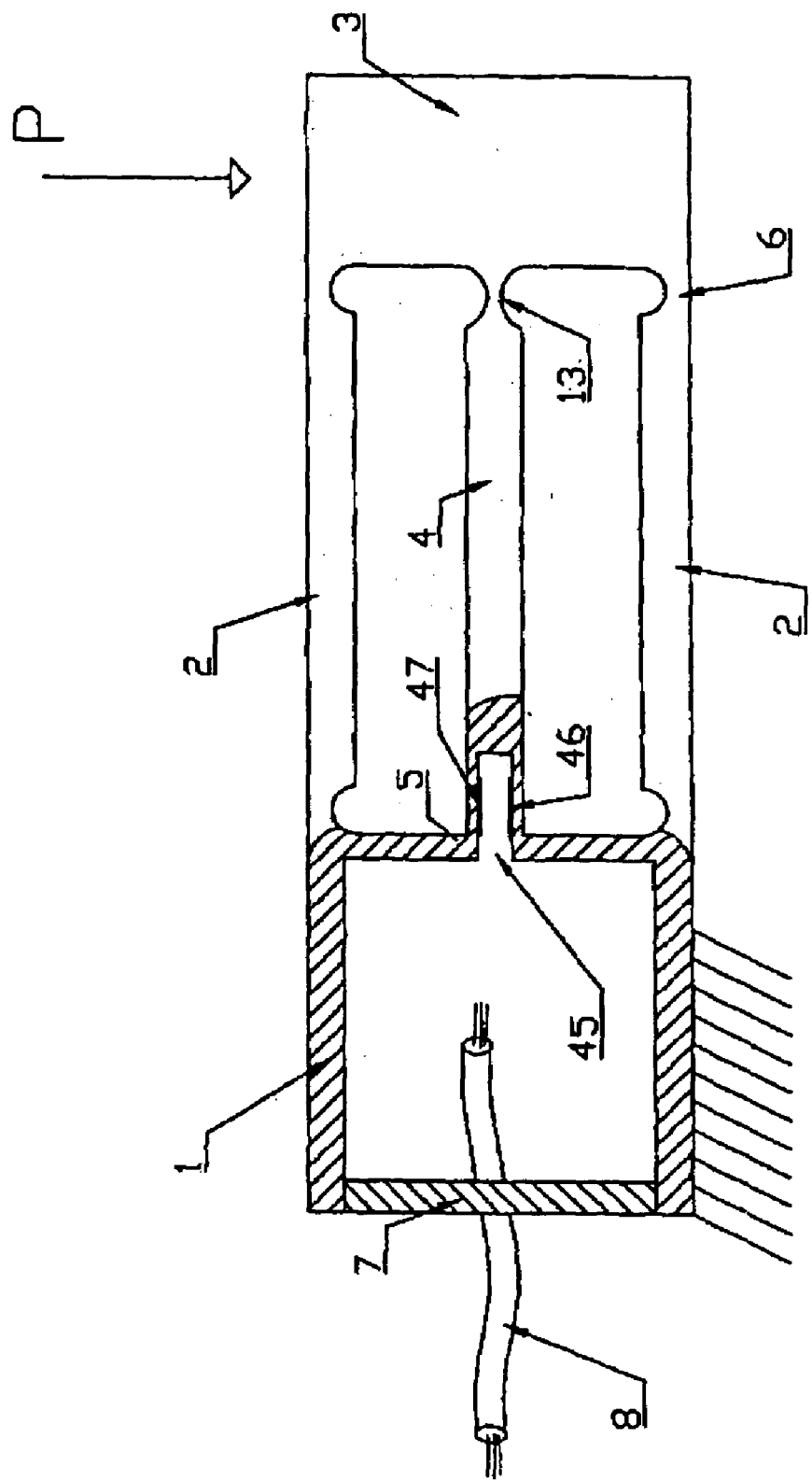
FIG. 24 is an embodiment of the invention, where the flexible wall continues into and constitutes a part of the lever, acting on the flexible wall.

In FIG. 24 a load cell is shown where the flexible wall extends into the lever forming a cavity 45, providing the possibility of mounting for example strain sensors 46 and 47 into the cavity.

Other sensor means, of the types mentioned above, may be mounted into or at the surface of the flexible wall around the cavity 45.

A very important advantage, shared by all embodiments of the invention, is that the closure of the sensor cavity is performed at a distance from the flexible wall arid therefore, will not interfere with the measurement.

The method of hermetically sealing the sensor system in load cells according to prior art involves a metal bellows or metal covers, which due to their spring constant, interferes with the measurement.

Besides this they are costly to mount and not suitable for industrial environments.

Because of the high sensitivity of a capacitive sensor system, the demands on the yield strength of the material of the elastic body are rather low and manufacturing processes such as plasma cutting, sintering and casting may be used for low costs at high volumes when preferably capacitive sensors are used.

Due to the fact that preferred embodiments of the invention has been illustrated and described herein it will be apparent to those skilled in the art that modifications and improvements may be made to forms hei-ein specifically disclosed.

Accordingly, the present invention is not to be limited to the forms specifically disclosed.

For example the flexible wall, with the sensor means, may be positioned in the load I receiving part 3, or flexible walls with sensors may be positioned in both the base end and the load receiving end.

Further the lever 4 may, according to the invention, be placed anywhere between the flexible wall 5 and the load receiving part 3.

Still further, load cells according to the invention, may have more than two levers engaging the flexible wall in order to tailor the deformation of the flexible wall to suit specific sensors.

What is claimed is:

1. Load cell with an elastic body, said load cell comprising a base end, a load or force receiving part, two or more beams connecting said base end and said load or force receiving part, and sensor means adapted for sensing the strain of the elastic body, due to a load or force to be measured, characterized in that at least one of said beams constitutes a lever connecting the load or force receiving part and a flexible wall of a sensor cavity placed in the base end, said sensor cavity includes said sensor means, said flexible wall being adapted for undergoing deformation as the result of a displacement of the load or force receiving part through an action of said lever, and said sensor means being adapted for measuring the deformation of the flexible wall or the strain in the flexible wall.

2. Load cell according to claim 1, characterized in that said sensor means includes a plurality of sensors.

3. Load cell according to claim 1, characterized in that said sensor means includes at least one sensor mounted on a surface of a sensor carrier, said surface facing the flexible wall.

4. Load cell according to claim 1, characterized in that said sensor means includes at least one sensor, mounted on a sensor carrier which is mounted on a stud, substantially perpendicular to the flexible wall.

5. Load cell according to claim 1, characterized in that said sensor means includes a sensor system comprising a number of fins mounted on and substantially perpendicular to the flexible wall, with sensors placed on one or more of the fins and being adapted for measuring the deformation of the flexible wall.

6. Load cell according to claim 2, characterized in that said sensor means includes a sensor system comprising a number of fins mounted on and substantially perpendicular to the flexible wall, with sensors placed between one or more of the fins and being adapted for measuring the deformation of the flexible wall.

7. Load cell according to claim 5, characterized in that the width of the levers and the fins are smaller than the width of the sensor cavity.

8. Load cell according to claim 5, characterized in that the fins are separate units mounted on the flexible wall.

9. Load cell according to claim 1, characterized in that said sensor means includes at least one sensor carrier, which is mounted on a short stud, substantially perpendicular to the flexible wall, electrodes are placed on the sensor carrier, facing the flexible wall.

10. Load cell according to claim 1, characterized in that said sensor means includes two separate sensor carriers, one above the other, which each are mounted on a short stud, substantially perpendicular to the flexible wall, with electrodes placed on each of the sensor carriers, facing the flexible wall.

11. Load cell according to claim 10, characterized in that said sensor means includes two separate levers engaging the flexible wall, at the positions of the two short studs carrying the two sensor carriers.

12. Load cell according to claim 1, characterized in that the sensor means are capacitive.

13. Load cell according to claim 1, characterized in that the sensor means are inductive.

14. Load cell according to claim 1, characterized in that said sensor means includes one or more strain sensors mounted on the flexible walls for measuring the strains in the flexible walls.

15. Load cell according to claim 1, characterized in that said sensor means includes one or more strain gage sensors mounted on the flexible walls for measuring the strains in the flexible walls.

* * * * *